(12) United States Patent
Greenhalgh et al.

(10) Patent No.: US 8,418,187 B2
(45) Date of Patent: Apr. 9, 2013

(54) VIRTUALIZATION SOFTWARE MIGRATING WORKLOAD BETWEEN PROCESSING CIRCUITRIES WHILE MAKING ARCHITECTURAL STATES AVAILABLE TRANSPARENT TO OPERATING SYSTEM

(75) Inventors: Peter Richard Greenhalgh, Cambridge (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 354 days.

(21) Appl. No.: 12/659,234

(22) Filed: Mar. 1, 2010

(65) Prior Publication Data

US 2011/0213934 A1    Sep. 1, 2011

(51) Int. Cl.
*G06F 9/50*    (2006.01)
(52) U.S. Cl.
USPC .......................................... 718/105; 712/228
(58) Field of Classification Search .................. None
See application file for complete search history.

(56) References Cited

U.S. PATENT DOCUMENTS

| | | | |
|---|---|---|---|
| 5,913,068 A | 6/1999 | Matoba | |
| 6,263,405 B1 | 7/2001 | Irie et al. | |
| 6,374,362 B1 | 4/2002 | Ohtsu | |
| 6,501,999 B1 | 12/2002 | Cai | |
| 6,631,474 B1 | 10/2003 | Cai et al. | |
| 7,275,124 B2 | 9/2007 | Ogilvie et al. | |
| 7,461,275 B2 | 12/2008 | Belmont et al. | |
| 7,996,663 B2 * | 8/2011 | Stillwell et al. | 712/244 |
| 2002/0095609 A1 | 7/2002 | Tokunaga | |
| 2004/0003309 A1 | 1/2004 | Cai et al. | |
| 2005/0132239 A1 | 6/2005 | Athas et al. | |
| 2006/0064606 A1 | 3/2006 | Kim et al. | |
| 2007/0079150 A1 | 4/2007 | Belmont et al. | |
| 2008/0288748 A1 | 11/2008 | Sutardja et al. | |
| 2009/0172369 A1 | 7/2009 | Stillwell et al. | |
| 2010/0332661 A1 * | 12/2010 | Tameshige | 709/226 |
| 2011/0161586 A1 | 6/2011 | Potkonjak et al. | |
| 2011/0213947 A1 * | 9/2011 | Mathieson et al. | 712/16 |

FOREIGN PATENT DOCUMENTS

| | | |
|---|---|---|
| WO | WO 2004/102376 | 11/2004 |
| WO | WO 2005/062180 | 7/2005 |

OTHER PUBLICATIONS

Kumar et al., "Single-ISA Heterogeneous Multi-Core Architectures: The Potential for Processor Power Reduction", Proceedings of the 36th International Symposium, *IEEE Computer Society*, 2003, 12 pgs.

(Continued)

*Primary Examiner* — Kenneth Kim
(74) *Attorney, Agent, or Firm* — Nixon & Vanderhye P.C.

(57) ABSTRACT

A data processing apparatus has first processing circuitry which is architecturally compatible with second processing circuitry, but with the first processing circuitry being micro-architecturally different from the second processing circuitry. A switch controller performs a handover operation to transfer performance of the workload from source processing circuitry to destination processing circuitry, with the source processing circuitry being one of the first and second processing circuitry and the destination processing circuitry being the other of the first and second processing circuitry. During the handover operation, the switch controller causes the source processing circuitry to makes it current architectural state available to the destination processing circuitry and is necessary for the destination processing circuitry to successfully lake over performance of the workload from the source processing circuitry. The switch controller masks predetermined processor specific configuration information such that the transfer of the workload is transparent to that operating system.

19 Claims, 14 Drawing Sheets

OTHER PUBLICATIONS

Kumar et al., "Towards Better Performance Per Watt in Virtual Environments on Asymmetric Single-ISA Multi-core Systems", (No Date), pp. 105-109.
Kumar et al., "Conjoined-core Chip Multiprocessing", Proceedings of the 37$^{th}$ International Symposium, Dec. 2004, pp. 1-12.
Becchi et al., "Dynamic Thread Assignment on Heterogeneous Multiprocessor Architectures", *CF'06*, May 2006, pp. 29-39.
International Search Report and Written opinion of the International Searching Authority mailed Jul. 25, 2011 in PCT/GB2011/050319.
International Search Report and Written opinion of the International Searching Authority mailed Jul. 25, 2011 in PCT/GB2011/050315.
International Search Report and Written opinion of the International Searching Authority mailed Jul. 25, 2011 in PCT/GB2011/050317.
U.S. Appl. No. 12/659,235, filed Mar. 1, 2010, Greenhalgh et al.
U.S. Appl. No. 12/659,230, filed Mar. 1, 2010, Greenhalgh.
U.S. Appl. No. 12/662,743, filed Apr. 30, 2010, Hill.
International Preliminary Report on Patentability mailed Jun. 25, 2012 in PCT/GB2011/050315.
Office Action mailed Jun. 27, 2012 in co-pending U.S. Appl. No. 12/659,230.
International Preliminary Report on Patentability dated Oct. 5, 2012 in PCT/GB2011/050376.
Office Action mailed Dec. 21, 2012 in co-pending U.S. Appl. No. 12/659,235.
Office Action mailed Nov. 23, 2012 in co-pending U.S. Appl. No. 12/662,743.

\* cited by examiner

VIRTUALIZATION SOFTWARE MIGRATING WORKLOAD BETWEEN PROCESSING CIRCUITRIES WHILE MAKING ARCHITECTURAL STATES AVAILABLE TRANSPARENT TO OPERATING SYSTEM

BACKGROUND OF THE INVENTION

1. Field of the Invention

The present invention relates to a data processing apparatus and method for switching a workload between first and second processing circuitry, and in particular to a technique for performing such switching so as to improve energy efficiency of the data processing apparatus.

2. Description of the Prior Art

In modern data processing systems, the difference in performance demand between high intensity tasks such as games operation and low intensity tasks such as MP3 playback can exceed a ratio of 100:1. For a single processor to be used for all tasks, that processor would have to be high performance, but an axiom of processor micro-architecture is that high performance processors are less energy efficient than low performance processors. It is known to improve energy efficiency at the processor level using techniques such as Dynamic Voltage and Frequency Scaling (DVFS) or power gating to provide the processor with a range of performance levels and corresponding energy consumption characteristics. However, such techniques are generally becoming insufficient to allow a single processor to take on tasks with such diverging performance requirements.

Accordingly, consideration has been given to using multi-core architectures to provide an energy efficient system for the performance of such diverse tasks. Whilst systems with multiple processor cores have been used for some time to increase performance, by allowing the different cores to operate in parallel on different tasks in order to increase throughput, analysis as to how such systems could be used to improve energy efficiency has been a relatively recent development.

The article "Towards Better Performance Per Watt in Virtual Environments on Asymmetric Single-ISA Multi-Core Systems" by V Kumar et al, ACM SIGOPS Operating Systems Review, Volume 43, Issue 3 (July 2009), discusses Asymmetric Single Instruction Set Architecture (ASISA) multi-core systems, consisting of several cores exposing the same instruction set architecture (ISA) but differing in features, complexity, power consumption, and performance. In the paper, properties of virtualised workloads are studied to shed insight into how these workloads should be scheduled on ASISA systems in order to improve performance and energy consumption. The paper identifies that certain tasks are more applicable to high frequency/performance micro-architectures (typically compute intensive tasks), while others are more suited to lower frequency/performance micro-architectures and as a side effect will consume less energy (typically input/output intensive tasks). Whilst such studies show how ASISA systems might be used to run diverse tasks in an energy efficient manner, it is still necessary to provide a mechanism for scheduling individual tasks to the most appropriate processors, and such scheduling management will typically place a significant burden on the operating system.

The article "Single-ISA Heterogeneous Multi-Core Architectures: The Potential for Processor Power Reduction" by R Kumar et al, Proceedings of the 36$^{th}$ International Symposium of Microarchitecture (MICRO-36'03) discusses a multi-core architecture where all cores execute the same instruction set, but have different capabilities and performance levels. At run time, system software evaluates the resource requirements of an application and chooses the core that can best meet these requirements while minimising energy consumption. As discussed in section 2 of that paper, during an application's execution, the operating system software tries to match the application to the different cores, attempting to meet a defined objective function, for example a particular performance requirement. In section 2.3, it is noted that there is a cost to switching cores, which necessitates restriction of the granularity of switching. A particular example is then discussed where, if the operating system decides a switch is in order, it powers up the new core, triggers a cache flush to save all dirty cache data to a shared memory structure, and then signals the new core to start at a predefined operating system entry point. The old core can then be powered down, whilst the new core retrieves required data from memory. Such an approach is described in section 2.3 as allowing an application to be switched between cores by the operating system. The remainder of the paper then discusses how such switching may be performed dynamically within a multi-core setting with the aim of reducing energy consumption.

Whilst the above paper discusses the potential for single-ISA heterogeneous multi-core architectures to provide energy consumption reductions, it still requires the operating system to be provided with sufficient functionality to enable scheduling decisions for individual applications to be made. The role of the operating system in this respect is made more complex when switching between processor instances with different architectural features. In this regard, it should be noted that the Alpha cores EV4 to EV8 considered in the paper are not fully ISA compatible, as discussed for example in the fifth paragraph of section 2.2.

Further, the paper does not address the problem that there is a significant overhead involved in switching applications between cores, which can significantly reduce the benefits to be achieved from such switching.

SUMMARY OF THE INVENTION

Viewed from a first aspect, the present invention provides a data processing apparatus comprising: first processing circuitry for performing data processing operations; second processing circuitry for performing data processing operations; the first processing circuitry being architecturally compatible with the second processing circuitry, such that a workload to be performed by the data processing apparatus can be performed on either the first processing circuitry or the second processing circuitry, said workload comprising at least one application and at least one operating system for running said at least one application; the first processing circuitry being micro-architecturally different from the second processing circuitry, such that performance of the first processing circuitry is different to performance of the second processing circuitry; the first and second processing circuitry being configured such that the workload is performed by one of the first processing circuitry and the second processing circuitry at any point in time; a switch controller, responsive to a transfer stimulus, to perform a handover operation to transfer performance of the workload from source processing circuitry to destination processing circuitry, the source processing circuitry being one of the first processing circuitry and the second processing circuitry, and the destination processing circuitry being the other of the first processing circuitry and the second processing circuitry; the switch controller being arranged, during the handover operation: (i) to cause the source processing circuitry to make its current architectural state available to the destination processing circuitry, the current architectural state being that state not available from shared memory shared between the first and second processing circuitry at a time the handover operation is initiated, and that is necessary for the destination processing circuitry to successfully take over performance of the workload from the source processing circuitry; and (ii) to mask predetermined processor specific configuration information from said at least one operating system such that the transfer of the workload is transparent to said at least one operating system.

In accordance with the present invention, a data processing apparatus is provided with first and second processing circuitry, which are architecturally compatible with each other, but micro-architecturally different. Due to the architectural compatibility of the first and second processing circuitry, a workload consisting not just of one or more applications, but also including at least one operating system for running those one or more applications, can be moved between the first and second processing circuitry. Further because the first and second processing circuitry are micro-architecturally different, the performance characteristics (and hence energy consumption characteristics) of the first and second processing circuitry differs.

In accordance with the present invention, at any point in time the workload is performed by one of the first and second processing circuits and a switch controller is responsive to a transfer stimulus to perform a handover operation to transfer performance of the workload between the processing circuits. Upon receipt of a transfer stimulus, whichever of the two processing circuits is currently performing the workload is considered to be the source processing circuitry, and the other is considered to be the destination processing circuitry. The switch controller responsible for performing the handover operation causes the source processing circuitry's current architectural state to be made available to the destination processing circuitry, and further masks predetermined processor specific configuration information from the at least one operating system forming part of the workload, such that the transfer of the workload is transparent to that operating system.

Through use of the present invention, it is possible to migrate an entire workload from one processing circuitry to the other whilst masking that transfer from the operating system, and whilst ensuring that the necessary architectural state that is not available in shared memory at the time the handover operation is initiated is made available to the destination processing circuitry so that it can successfully takeover performance of the workload.

By treating the entire workload as a macroscopic entity that is performed on only one of the first and second processing circuits at any particular point in time, the technique of the present invention enables that workload to be readily switched between the first and second processing circuits in a manner transparent to the operating system, whilst ensuring that the destination processing circuit has all the information necessary to enable it to successfully take over performance of the workload. Such an approach addresses the earlier mentioned problems that result from using the operating system to manage scheduling of applications to particular processing circuits, and has been found to enable significant energy consumption savings to be achieved.

In one embodiment, the data processing apparatus further comprises: power control circuitry for independently controlling power provided to the first processing circuitry and the second processing circuitry; wherein prior to occurrence of the transfer stimulus the destination processing circuitry is in a power saving condition, and during the handover operation the power control circuitry causes the destination processing circuitry to exit the power saving condition prior to the destination processing circuitry taking over performance of the workload. Through use of such power control circuitry, it is possible to reduce the energy consumed by any processing circuitry not currently performing the workload.

In one embodiment, following the handover operation, the power control circuitry causes the source processing circuitry to enter the power saving condition. This can occur immediately following the handover operation, or in alternative embodiments the source processing circuitry may be arranged to only enter the power saving condition after some predetermined period of time has elapsed, which can allow data still retained by the source processing circuitry to be made available to the destination processing circuitry in a more energy efficient and higher performance manner.

A further problem existing in the prior art, irrespective of the manner in which a switch between different processing circuits takes place, is how to transfer in a fast and energy efficient manner the information required for that switch to be successful. In particular, the earlier-mentioned current architectural state needs to be made available to the destination processing circuitry. One way this could be achieved would be to write all of the that current architectural state out to shared memory as part of the handover operation, so that it could then be read from shared memory by the destination processing circuitry. As used herein, the term "shared memory" refers to memory which can be directly accessed by both the first processing circuitry and the second processing circuitry, for example main memory coupled to both the first and second processing circuitry via an interconnect.

However, a problem that arises when writing all of the current architectural state to shared memory is that such a process not only takes a significant amount of time, but also consumes significant energy, which can dramatically offset the potential benefits that can be achieved by performing the switch.

In accordance with one embodiment, during the transfer operation, the switch controller causes the source processing circuitry to employ an accelerated mechanism to make its current architectural state available to the destination processing circuitry without reference by the destination processing circuitry to the shared memory in order to obtain the current architectural state. Hence, in accordance with such embodiments, a mechanism is provided which avoids the requirement for the architectural state to be routed via the shared memory in order for it to be made available to the destination processing circuitry. This results not only in a performance improvement during the transfer operation, but also a reduction in energy consumption associated with the transfer operation.

In one embodiment, at least the source circuitry has an associated cache, the data processing apparatus further comprises snoop control circuitry, and the accelerated mechanism comprises transfer of the current architectural state to the destination processing circuitry through use of the source circuitry's associated cache and the snoop control circuitry.

In accordance with this technique, the source processing circuitry's local cache is used to store the current architectural state that must be made available to the destination processor. That state is then marked as shareable, which allows that state to be snooped by the destination processing circuitry using the snoop control circuitry. Hence, in such embodiments, the first and second processing circuitry are made hardware cache coherent with one another, this reducing the amount of time, energy and hardware complexity involved in switching from the source processing circuitry to the destination processing circuitry.

In one particular embodiment, the accelerated mechanism is a save and restore mechanism, which causes the source processing circuitry to store its current architectural state to its associated cache, and causes the destination processing circuitry to perform a restore operation via which the snoop control circuitry retrieves the current architectural state from the source processing circuitry's associated cache and provides that retrieved current architectural state to the destination processing circuitry. The save/store mechanism provides a particularly efficient technique for saving the architectural state into the source circuitry's local cache, and for the destination processing circuitry to then retrieve that state.

Such an approach may be used irrespective of whether the destination processing circuitry has its own associated local cache or not. Whenever a request for an item of the architectural state is received by the snoop control circuitry, either directly from the destination processing circuitry, or from an associated local cache of the destination processing circuitry in the event of a cache miss, then it will determine that the required item of architectural state is stored in the local cache associated with the source circuitry and retrieve that data from the source circuitry's local cache for return to the destination processing circuitry (either directly or via the destination processing circuitry's associated cache if present).

In one particular embodiment, the destination processing circuitry does have an associated cache in which the transferred architectural state obtained by the snoop control circuitry is stored for reference by the destination processing circuitry.

However, the hardware cache coherency approach described above is not the only technique that could be used for providing the earlier-mentioned accelerated mechanism. For example, in an alternative embodiment, the accelerated mechanism comprises a dedicated bus between the source processing circuitry and the destination processing circuitry over which the source processing circuitry provides its current architectural state to the destination processing circuitry. Whilst such an approach will typically have a higher hardware cost than employing the cache coherency approach, it would provide an even faster way of performing the switching, which could be beneficial in certain implementations.

The switch controller can take a variety of forms. However, in one embodiment the switch controller comprises at least virtualisation software logically separating the at least one operating system from the first processing circuitry and the second processing circuitry. It is known to use virtual machines to allow applications written using a particular set of native instructions to be executed on hardware having a different native instruction set. The applications are executed in a virtual machine environment, where the applications' instructions are native to the virtual machine, but the virtual machine is implemented by software executing on the hardware having a different native instruction set. The virtualisation software provided by the switch controller of the above embodiment can be viewed as operating in a similar way to a hypervisor in a virtual machine environment, since it provides separation between the workload and the underlying hardware platform. In the context of the present invention, the virtualisation software provides an efficient mechanism for transferring the workload from one processing circuitry to another processing circuitry whilst masking processor specific configuration information from the operating system(s) forming that workload.

The transfer stimulus can be generated for a variety of reasons. However, in one embodiment, timing of the transfer stimulus is chosen so as to improve energy efficiency of the data processing apparatus. This can be achieved in a variety of ways. For example, the performance counters of the processing circuitry can be set up to count performance sensitive events (for example the number of instructions executed, or the number of load-store operations). Coupled with a cycle counter or a system timer, this allows identification that a highly compute intensive application is executing that may be better served by switching to the higher performance processing circuitry, identification of a large number of load-store operations indicating an IO intensive application which may be better served on the energy efficient processing circuitry, etc. An alternative approach is for applications to be profiled and marked as 'big', 'little' or 'big/little', whereby the operating system can interface with the switch controller to move the workload accordingly (here the term "big" refers to a higher performance processing circuitry, and the term "little" refers to a more energy efficient processing circuitry).

The architectural state that is required for the destination processing circuitry to successfully take over performance of the workload from the source processing circuitry can take a variety of forms. However, in one embodiment, the architectural state comprises at least the current value of one or more special purpose registers of the source processing circuitry, including a program counter value. In addition to the program counter value, various other information that may be stored within the special purpose registers. For example, other special purpose registers include processor status registers (e.g. the CPSR and SPSR in the ARM architecture) that hold control bits for processor mode, interrupt masking, execution state and flags. Other special purpose registers include architectural control (the CP15 system control register in the ARM architecture) that hold bits to alter data endianness, turn the MMU on or off, turn data/instruction caches on or off, etc. Other special purpose registers in CP15 store exception address and status information.

In one embodiment, the architectural state further comprises the current values stored in an architectural register file of the source processing circuitry. As will be understood by those skilled in the art, the architectural register file contains registers that will be referred to by the instructions executed whilst applications are running, those registers holding source operands for computations, and providing locations to which results of those computations are stored.

In one embodiment, at least one of the first processing circuitry and the second processing circuitry comprise a single processing unit. Further, in one embodiment, at least one of the first processing circuitry and the second processing circuitry comprise a cluster of processing units with the same microarchitecture. In one particular embodiment, the first processing circuitry may comprise a cluster of processing units with the same microarchitecture, whilst the second processing circuitry comprises a single processing unit (with a different microarchitecture to the microarchitecture of the processing units within the cluster forming the first processing circuitry).

The power saving condition that the power control circuitry can selectively place the first and second processing circuits in can take a variety of forms. In one embodiment, the power saving condition is one of: a powered off condition; a partial/full data retention condition; a dormant condition; or an idle condition. Such conditions will be well understood by a person skilled in the art, and accordingly will not be discussed in more detail herein.

There are a number of ways in which the first and second processing circuits can be arranged to be micro-architecturally different. In one embodiment, the first processing circuitry and second processing circuitry are micro-architecturally different by having at least one of: different execution pipeline lengths; or different execution resources. Differences in pipeline length will typically result in differences in operating frequency, which in turn will have an effect on performance. Similarly, differences in execution resources will have an effect on throughput and hence performance. For example, a processing circuit having wider execution resources will enable more information to be processed at any particular point in time, improving throughput. In addition, or alternatively, one processing circuit may have more execution resources than the other, for example, more arithmetic logic units (ALUs), which again will improve throughput. As another example of different execution resources, an energy efficient processing circuit may be provided with a simple in-order pipeline, whilst a higher performance processing circuit may be provided with an out-of-order superscalar pipeline.

A further problem that can arise when using high performance processing circuits, for example running at GHz frequencies, is that such processors are approaching, and sometimes exceeding, the thermal limits that they were designed to operate within. Known techniques for seeking to address these problems can involve the processing circuit being put into a low-power condition to reduce heat output, which may include clock throttling and/or voltage reduction, and potentially even turning the processing circuit off completely for a period of time. However, when adopting the technique of embodiments of the present invention, it is possible to implement an alternative approach to avoid the thermal limits being exceeded. In particular, in one embodiment, the source processing circuitry is higher performance than the destination processing circuitry, and the data processing apparatus further comprises thermal monitoring circuitry for monitoring a thermal output of the source processing circuitry, and for triggering said transfer stimulus when said thermal output reaches a predetermined level. In accordance with such techniques, the entire workload can be migrated from the higher performance processing circuitry to the lower performance processing circuitry, whereafter less heat will be generated, and the source processing circuitry will be allowed to cool down. Hence, the package containing the two processing circuits can cool while continued program execution can take place, albeit at lower throughput.

The data processing apparatus can be arranged in a variety of ways. However, in one embodiment the first processing circuitry and the second processing circuitry reside within a single integrated circuit.

Viewed from a second aspect, the present invention provides a data processing apparatus comprising: first processing means for performing data processing operations; second processing means for performing data processing operations; the first processing means being architecturally compatible with the second processing means, such that a workload to be performed by the data processing apparatus can be performed on either the first processing means or the second processing means, said workload comprising at least one application and at least one operating system for running said at least one application; the first processing means being micro-architecturally different from the second processing means, such that performance of the first processing means is different to performance of the second processing means; the first and second processing means being configured such that the workload is performed by one of the first processing means and the second processing means at any point in time; a transfer control means, responsive to a transfer stimulus, for performing a handover operation to transfer performance of the workload from source processing means to destination processing means, the source processing means being one of the first processing means and the second processing means, and the destination processing means being the other of the first processing means and the second processing means; the transfer control means, during the handover operation: (i) for causing the source processing means to make its current architectural state available to the destination processing means, the current architectural state being that state not available from shared memory means shared between the first and second processing means at a time the handover operation is initiated, and that is necessary for the destination processing means to successfully take over performance of the workload from the source processing means; and (ii) for masking predetermined processor specific configuration information from said at least one operating system such that the transfer of the workload is transparent to said at least one operating system.

Viewed from a third aspect, the present invention provides a method of operating a data processing apparatus having first processing circuitry for performing data processing operations and second processing circuitry for performing data processing operations, the first processing circuitry being architecturally compatible with the second processing circuitry, such that a workload to be performed by the data processing apparatus can be performed on either the first processing circuitry or the second processing circuitry, said workload comprising at least one application and at least one operating system for running said at least one application, and the first processing circuitry being micro-architecturally different from the second processing circuitry, such that performance of the first processing circuitry is different to performance of the second processing circuitry, the method comprising the steps of: performing, at any point in time, the workload on one of the first processing circuitry and the second processing circuitry; performing, in response to a transfer stimulus, a handover operation to transfer performance of the workload from source processing circuitry to destination processing circuitry, the source processing circuitry being one of the first processing circuitry and the second processing circuitry, and the destination processing circuitry being the other of the first processing circuitry and the second processing circuitry; during the handover operation: (i) causing the source processing circuitry to make its current architectural state available to the destination processing circuitry, the current architectural state being that state not available from shared memory shared between the first and second processing circuitry at a time the handover operation is initiated, and that is necessary for the destination processing circuitry to successfully take over performance of the workload from the source processing circuitry; and (ii) masking predetermined processor specific configuration information from said at least one operating system such that the transfer of the workload is transparent to said at least one operating system.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
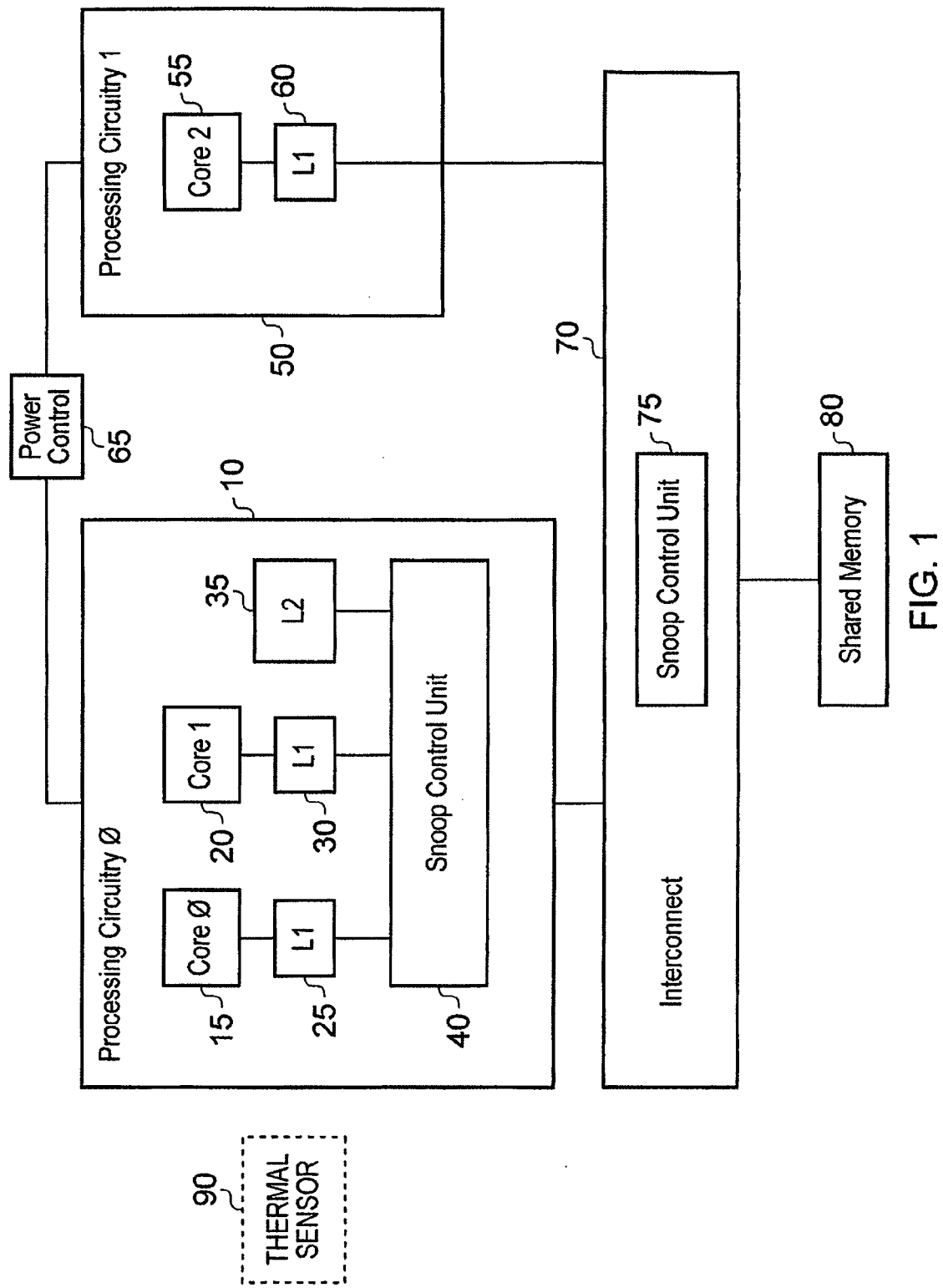
FIG. 1 is a block diagram of a data processing system in accordance with one embodiment.

FIG. 1 is a block diagram schematically illustrating a data processing system in accordance with one embodiment. As shown in FIG. 1, the system contains two architecturally compatible processing circuit instances (the processing circuitry 0 10 and the processing circuitry 1 50), but with those different processing circuit instances having different micro-architectures. In particular, the processing circuitry 10 is arranged to operate with higher performance than the processing circuitry 50, but with the trade-off that the processing circuitry 10 will be less energy efficient than the processing circuitry 50. Examples of micro-architectural differences will be described in more detail below with reference to FIGS. 8A and 8B.

Each processing circuit may include a single processing unit (also referred to herein as a processor core), or alternatively at least one of the processing circuit instances may itself comprise a cluster of processing units with the same micro-architecture.

In the example illustrated in FIG. 1, the processing circuit 10 includes two processor cores 15, 20 which are both architecturally and micro-architecturally identical. In contrast, the processing circuit 50 contains only a single processor core 55. In the following description, the processor cores 15, 20 will be referred to as "big" cores, whilst the processor core 55 will be referred to as a "little" core, since the processor cores 15, 20 will typically be more complex than the processor core 55 due to those cores being designed with performance in mind, whereas in contrast the processor core 55 is typically significantly less complex due to being designed with energy efficiency in mind.

In FIG. 1, each of the cores 15, 20, 55 is assumed to have its own associated local level 1 cache 25, 30, 60, respectively, which may be arranged as a unified cache for storing both instructions and data for reference by the associated core, or can be arranged with a Harvard architecture, providing distinct level 1 data and level 1 instruction caches. Whilst each of the cores is shown as having its own associated level 1 cache, this is not a requirement, and in alternative embodiments, one or more of the cores may have no local cache.

In the embodiment shown in FIG. 1, the processing circuitry 10 also includes a level 2 cache 35 shared between the core 15 and the core 20, with a snoop control unit 40 being used to ensure cache coherency between the two level 1 caches 25, 30 and the level 2 cache 35. In one embodiment, the level 2 cache is arranged as an inclusive cache, and hence any data stored in either of the level 1 caches 25, 30 will also reside in the level 2 cache 35. As will be well understood by those skilled in the art, the purpose of the snoop control unit 40 is to ensure cache coherency between the various caches, so that it can be ensured that either core 15, 20 will always access the most up-to-date version of any data when it issues an access request. Hence, purely by way of example, if the core 15 issues an access request for data that does not reside in the associated level 1 cache 25, then the snoop control unit 40 intercepts the request as propagated on from the level 1 cache 25, and determines with reference to the level 1 cache 30 and/or the level 2 cache 35 whether that access request can be serviced from the contents of one of those other caches. Only if the data is not present in any of the caches is the access request then propagated on via the interconnect 70 to main memory 80, the main memory 80 being memory that is shared between both the processing circuitry 10 and the processing circuitry 50.

The snoop control unit 75 provided within the interconnect 70 operates in a similar manner to the snoop control unit 40, but in this instance seeks to maintain coherency between the cache structure provided within the processing circuitry 10 and the cache structure provided within the processing circuitry 50. In examples where the level 2 cache 35 is an inclusive cache, then the snoop control unit maintains hardware cache coherency between the level 2 cache 35 of the processing circuitry 10 and the level 1 cache 60 of the processing circuitry 50. However, if the level 2 cache 35 is arranged as an exclusive level 2 cache, then the snoop control unit 75 will also snoop the data held in the level 1 caches 25, 30 in order to ensure cache coherency between the caches of the processing circuitry 10 and the cache 60 of the processing circuitry 50.

In accordance with one embodiment, only one of the processing circuitry 10 and the processing circuitry 50 will be actively processing a workload at any point in time. For the purposes of the present application, the workload can be considered to comprise at least one application and at least one operating system for running that at least one application, such as illustrated schematically by the reference numeral 100 in FIG. 2. In this example, two applications 105, 110 are running under control of the operating system 115, and collectively the applications 105, 110 and the operating system 115 form the workload 100. The applications can be considered to exist at a user level, whilst the operating system exists at a privileged level, and collectively the workload formed by the applications and the operating system runs on a hardware platform 125 (representing the hardware level view). At any point in time that hardware platform will either be provided by the processing circuitry 10 or by the processing circuitry 50.

As shown in FIG. 1, power control circuitry 65 is provided for selectively and independently providing power to the processing circuitry 10 and the processing circuitry 50. Prior to a transfer of the workload from one processing circuit to the other, only one of the processing circuits will typically be fully powered, i.e. the processing circuit currently performing the workload (the source processing circuitry), and the other processing circuit (the destination processing circuitry) will typically be in a power saving condition. When it is determined that the workload should be transferred from one processing circuit to the other, there will then be a period of time during the transfer operation where both processing circuits are in the powered on state, but at some point following the transfer operation, the source processing circuit from which the workload has been transferred will then be placed into the power saving condition.

The power saving condition can take a variety of forms, dependent on implementation, and hence for example may be one of a powered off condition, a partial/full data retention condition, a dormant condition or an idle condition. Such conditions will be well understood by a person skilled in the art, and accordingly will not be discussed in more detail herein.

The aim of the described embodiments is to perform switching of the workload between the processing circuits depending on the required performance/energy level of the workload. Accordingly, when the workload involves the execution of one or more performance intensive tasks, such as execution of games applications, then the workload can be executed on the high performance processing circuit 10, either using one or both of the big cores 15, 20. However, in contrast, when the workload is only performing low performance intensity tasks, such as MP3 playback, then the entire workload can be transferred to the processing circuit 50, so as benefit from the energy efficiencies that can be realised from utilising the processing circuit 50.

To make best use of such switching capabilities, it is necessary to provide a mechanism that allows the switching to take place in a simple and efficient manner, so that the action of transferring the workload does not consume energy to an extent that will negate the benefits of switching, and also to ensure that the switching process is quick enough that it does not in itself degrade performance to any significant extent.

In one embodiment, such benefits are at least in part achieved by arranging the processing circuitry 10 to be architecturally compatible with the processing circuitry 50. This ensures that the workload can be migrated from one processing circuitry to the other whilst ensuring correct operation. As a bare minimum, such architectural compatibility requires both processing circuits 10 and 50 to share the same instruction set architecture. However, in one embodiment, such architectural compatibility also entails a higher compatibility requirement so as to ensure that the two processing circuit instances are seen as identical from a programmer's view. In one embodiment, this involves use of the same architectural registers, and one or more special purpose registers storing data used by the operating system when executing applications. With such a level of architectural compatibility, it is then possible to mask from the operating system 115 the transfer of the workload between processing circuits, so that the operating system is entirely unaware as to whether the workload is being executed on the processing circuitry 10 or on the processing circuitry 50.

Figure 2:
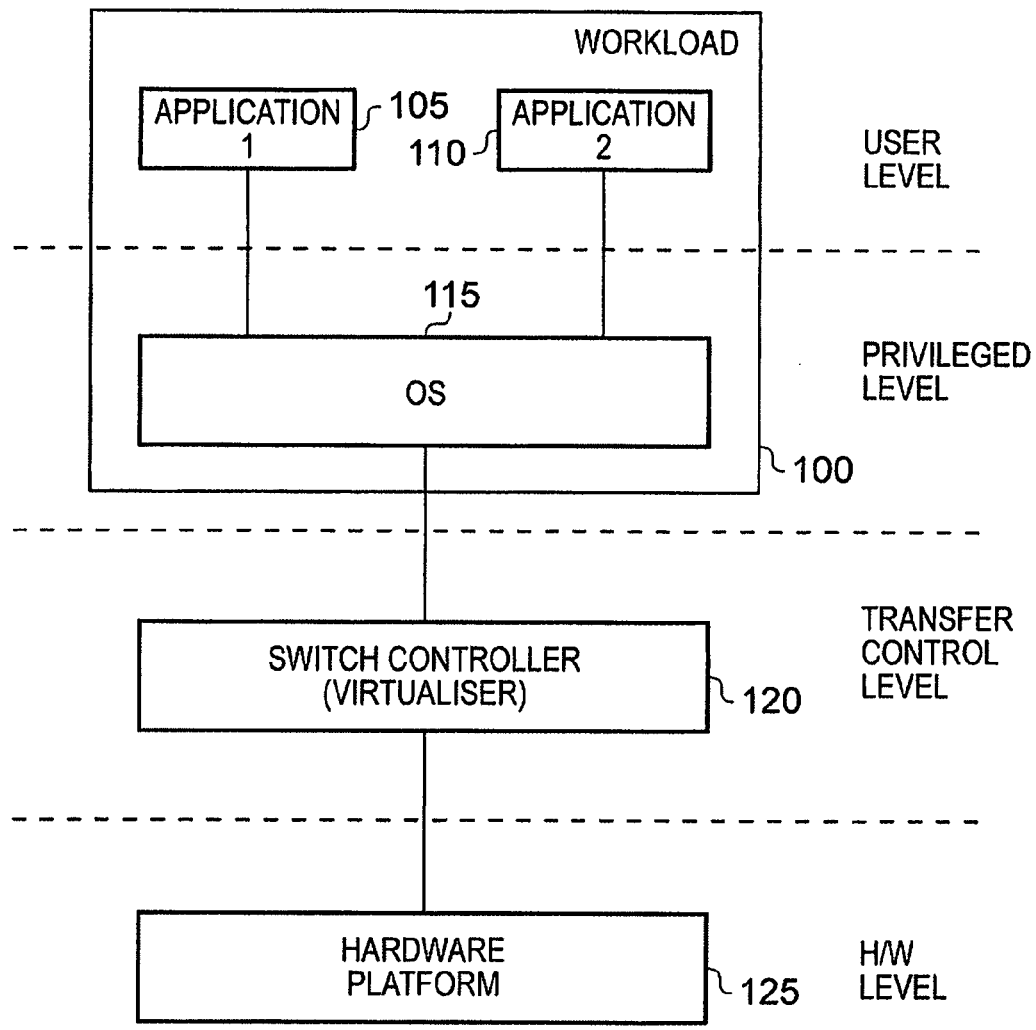
FIG. 2 schematically illustrates the provision of a switch controller (also referred to herein as a workload transfer controller) in accordance with one embodiment to logically separate the workload being performed by the data processing apparatus from the particular hardware platform within the data processing apparatus being used to perform that workload.

In one embodiment, the handling of the transfer from one processing circuit to the other is managed by the switch controller 120 shown in FIG. 2 (also referred to therein as a virtualiser and elsewhere herein as a workload transfer controller). The switch controller can be embodied by a mixture of hardware, firmware and/or software features, but in one embodiment includes software similar in nature to hypervisor software found in virtual machines to enable applications written in one native instruction set to be executed on a hardware platform adopting a different native instruction set. Due to the architectural compatibility between the two processing circuits 10, 50, the switch controller 120 can mask the transfer from the operating system 115 merely by masking one or more items of predetermined processor specific configuration information from the operating system. For example, the processor specific configuration information may include the contents of a CP15 processor ID register and CP15 cache type register.

In such an embodiment, the switch controller then merely needs to ensure that any current architectural state held by the source processing circuit at the time of the transfer, and that is not at the time the transfer is initiated already available from shared memory 80, is made available to the destination processing circuit in order to enable the destination circuit to be in a position to successfully take over performance of the workload. Using the earlier described example, such architectural state will typically comprise the current values stored in the architectural register file of the source processing circuitry, along with the current values of one or more special purpose registers of the source processing circuitry. Due to the architectural compatibility between the processing circuits 10, 50, if this current architectural state can be transferred from the source processing circuit to the destination processing circuit, the destination processing circuit will then be in a position to successfully take over performance of the workload from the source processing circuit.

Whilst architectural compatibility between the processing circuits 10, 50 facilitates transfer of the entire workload between the two processing circuits, in one embodiment the processing circuits 10, 50 are micro-architecturally different from each other, such that there are different performance characteristics, and hence energy consumption characteristics, associated with the two processing circuits. As discussed earlier, in one embodiment, the processing circuit 10 is a high performance, high energy consumption, processing circuit, while the processing circuit 50 is a lower performance, lower energy consumption, processing circuit. The two processing circuits can be micro-architecturally different from each other in a number of respects, but typically will have at least one of different execution pipeline lengths, and/or different execution resources. Differences in pipeline length will typically result in differences in operating frequency, which in turn will have an effect on performance. Similarly, differences in execution resources will have an effect on throughput and hence performance. Hence, by way of example, the processing circuitry 10 may have wider execution resources and/or more execution resources, in order to improve throughput. Further, the pipelines within the processor cores 15, 20 may be arranged to perform out-of-order superscalar processing, whilst the simpler core 55 within the energy efficient processing circuit 50 may be arranged as an in-order pipeline. A further discussion of micro-architectural differences will be provided later with reference to FIGS. 8A and 8B.

The generation of a transfer stimulus to cause the switch controller 120 to instigate a handover operation to transfer the workload from one processing circuit to another can be triggered for a variety of reasons. For example, in one embodiment, applications may be profiled and marked as 'big', 'little' or 'big/little', whereby the operating system can interface with the switch controller to move the workload accordingly. Hence, by such an approach, the generation of the transfer stimulus can be mapped to particular combinations of applications being executed, to ensure that when high performance is required, the workload is executed on the high performance processing circuit 10, whereas when that performance is not required, the energy efficient processing circuit 50 is instead used. In other embodiments, algorithms could be executed to dynamically determine when to trigger a transfer of the workload from one processing circuit to the other based on one or more inputs. For example, the performance counters of the processing circuitry can be set up to count performance sensitive events (for example the number of instructions executed, or the number of load-store operations). Coupled with a cycle counter or a system timer, this allows identification that a highly compute intensive application is executing that may be better served by switching to the higher performance processing circuitry, or identification of a large number of load-store operations indicating an IO intensive application which may be better served on the energy efficient processing circuitry, etc.

As a yet further example of when a transfer stimulus might be generated, the data processing system may include one or more thermal sensors 90 for monitoring the temperature of the data processing system during operation. It can be the case that modern high performance processing circuits, for example those running at GHz frequencies, sometimes reach, or exceed, the thermal limits that they were designed to operate within. By using such thermal sensors 90, it can be detected when such thermal limits are being reached, and under those conditions a transfer stimulus can be generated to trigger a transfer of the workload to a more energy efficient processing circuit in order to bring about an overall cooling of the data processing system. Hence, considering the example of FIG. 1 where the processing circuit 10 is a high performance processing circuit and the processing circuit 50 is a lower performance processing circuit consuming less energy, migration of the workload from the processing circuit 10 to the processing circuit 50 when the thermal limits of the device are being reached will bring about a subsequent cooling of the device, whilst still allowing continued program execution to take place, albeit at lower throughput.

Whilst in FIG. 1 two processing circuits 10, 50 are shown, it will be appreciated that the techniques of the above described embodiments can also be applied to systems incorporating more than two different processing circuits, allowing the data processing system to span a larger range of performance/energy levels. In such embodiments, each of the different processing circuits will be arranged to be architecturally compatible with each other to allow the ready migration of the entire workload between the processing circuits, but will also be micro-architecturally different to each other to allow choices to be made between the use of those processing circuits dependent on required performance/energy levels.

Figure 3:
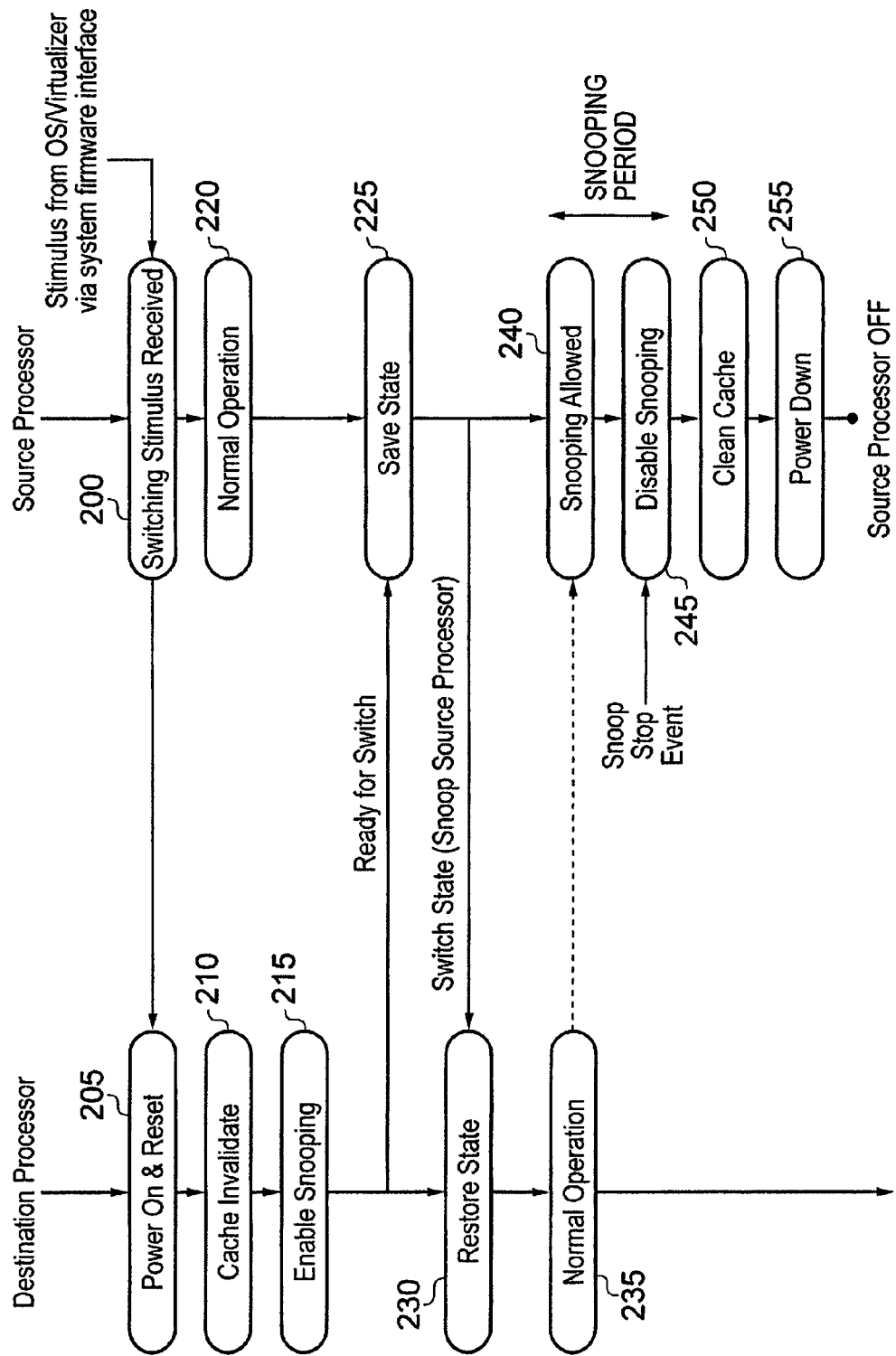
FIG. 3 is a diagram schematically illustrating the steps performed by both a source processor and a destination processor in response to a switching stimulus in order to transfer the workload from the source processor to the destination processor in accordance with one embodiment.

FIG. 3 is a flow diagram illustrating the sequence of steps performed on both the source processor and the destination processor when the workload is transferred from the source processor to the destination processor upon receipt of a transfer stimulus. Such a transfer stimulus may be generated by the operating system 115 or the virtualiser 120 via a system firmware interface resulting in the detection of the switching stimulus at step 200 by the source processor (which will be running not only the workload, but also the virtualiser software forming at least part of the switch controller 120).

Receipt of the transfer stimulus (also referred to herein as the switching stimulus) at step 200 will cause the power controller 65 to initiate a power on and reset operation 205 on the destination processor. Following such power on and reset, the destination processor will invalidate its local cache at step 210, and then enable snooping at step 215. At this point, the destination processor will then signal to the source processor that it is ready for the transfer of the workload to take place, this signal causing the source processor to execute a save state operation at step 225. This save state operation will be discussed in more detail later with reference to FIG. 4A, but in one embodiment involves the source processing circuitry storing to its local cache any of its current architectural state which is not available from shared memory at the time the handover operation is initiated, and that is necessary for the destination processor to successfully take over performance of the workload.

Following the save state operation 225, a switch state signal will be issued to the destination processor 230 indicating to the destination processor that it should now begin snooping the source processor in order to retrieve the required architectural state. This process takes place via a restore state operation 230 which will be discussed in more detail later with reference to FIG. 4B, but which in one embodiment involves the destination processing circuitry initiating a sequence of accesses which are intercepted by the snoop control unit 75 within the interconnect 70, and which cause the cached copy of the architectural state in the source processor's local cache to be retrieved and returned to the destination processor.

Following step 230, the destination processor is then in a position to take over processing of the workload, and accordingly normal operation begins at step 235.

In one embodiment, once normal operation begins on the destination processor, the source processor's cache could be cleaned as indicated at step 250, in order to flush any dirty data to the shared memory 80, and then the source processor could be powered down at step 255. However, in one embodiment, to further improve the efficiency of the destination processor, the source processor is arranged to remain powered up for a period of time referred to in FIG. 3 as the snooping period. During this time, at least one of the caches of the source circuit remains powered up, so that its contents can be snooped by the snoop control circuit 75 in response to access requests issued by the destination processor. Following the transfer of the entire workload using the process described in FIG. 3, it is expected that for at least an initial period of time after which the destination processor begins operation of the workload, some of the data required during the performance of the workload will reside in the source processor's cache. If the source processor had flushed its contents to memory, and been powered down, then the destination processor would during these early stages operate relatively inefficiently, since there would be a lot of cache misses in its local cache, and a lot of fetching of data from shared memory, resulting in a significant performance impact whilst the destination processor's cache is "warmed up", i.e. filled with data values required by the destination processor circuit to perform the operations specified by the workload. However, by leaving the source processor's cache powered up during the snooping period, the snoop control circuit 75 will be able to service a lot of these cache miss requests with reference to the source circuit's cache, yielding significant performance benefits when compared with the retrieval of that data from shared memory 80.

However, this performance benefit is only expected to last for a certain amount of time following the switch, after which the contents of the source processor's cache will become stale. Accordingly, at some point a snoop stop event will be generated to disable snooping at step 245, whereafter the source processor's cache will be cleaned at step 250, and then the source processor will be powered down at step 255. A discussion of the various scenarios under which the snoop stop event may be generated will be discussed in more detail later with reference to FIG. 6G.

Figure 4A:
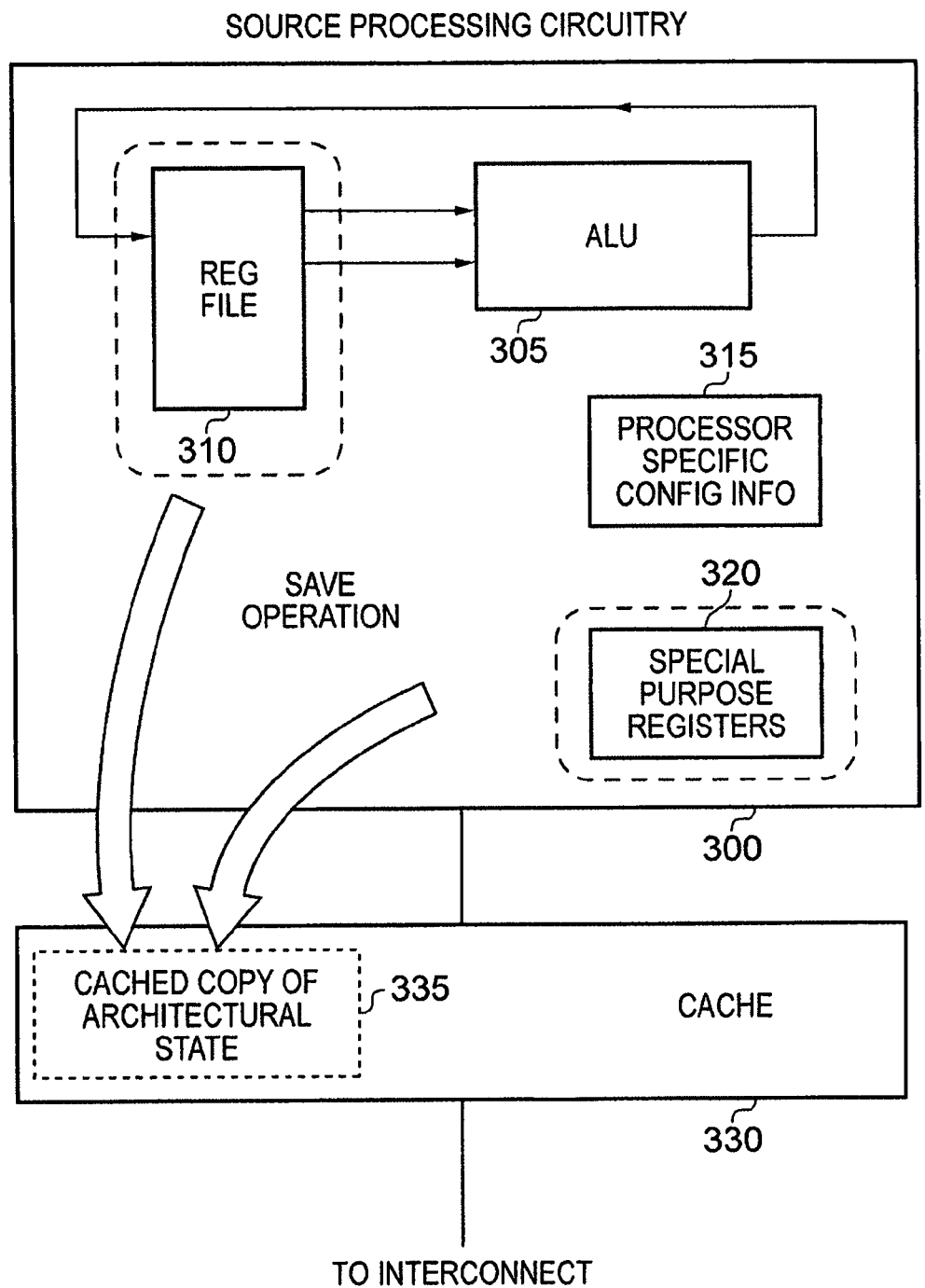
FIG. 4A schematically illustrates the storing of the source processing circuitry's current architectural state into its associated cache during the save operation of FIG. 3.

FIG. 4A schematically illustrates the save operation performed at step 225 in FIG. 3 in accordance with one embodiment. In particular, in one embodiment, the architectural state that needs to be stored from the source processing circuitry 300 to the local cache 330 consists of the contents of a register file 310 referenced by an arithmetic logic unit (ALU) 305 during the performance of data processing operations, along with the contents of various special purpose registers 320 identifying a variety of pieces of information required by the workload to successfully enable that workload to be taken over by the destination processing circuitry. The contents of the special purpose registers 320 will include for example a program counter value identifying a current instruction being executed, along with various other information. For example, other special purpose registers include processor status registers (e.g. the CPSR and SPSR in the ARM architecture) that hold control bits for processor mode, interrupt masking, execution state and flags. Other special purpose registers include architectural control (the CP15 system control register in the ARM architecture) that hold bits to alter data endianness, turn the MMU on or off, turn data/instruction caches on or off, etc. Other special purpose registers in CP15 store exception address and status information.

As schematically illustrated in FIG. 4A, the source processing circuit 300 will also typically hold some processor specific configuration information 315, but this information does not need saving to the cache 330, since it will not be applicable to the destination processing circuitry. The processor specific configuration information 315 is typically hard-coded in the source processing circuit 300 using logic constants, and may include, for example, the contents of the CP15 processor ID register (which will be different for each processing circuit) or the contents of the CP15 cache type register (which will depend on the configuration of the caches 25, 30, 60, for example indicating that the caches have different line lengths). When the operating system 115 requires a piece of processor specific configuration information 315, then unless the processor is already in hypervisor mode, an execution trap to hypervisor mode occurs. In response, the virtualiser 120 may in one embodiment indicate the value of the information requested, but in another embodiment will return a "virtual" value. In the case of the processor ID value, this virtual value can be chosen to be the same for both "big" and "little" processors, thereby causing the actual hardware configuration to be hidden from the operating system 115 by the virtualiser 120.

As illustrated schematically in FIG. 4A, during the save operation, the contents of the register file 310 and of the special purpose registers 320 is stored by the source processing circuitry into the cache 330 to form a cached copy 335. This cached copy is then marked as shareable, which allows the destination processor to snoop this state via the snoop control unit 75.

Figure 4B:
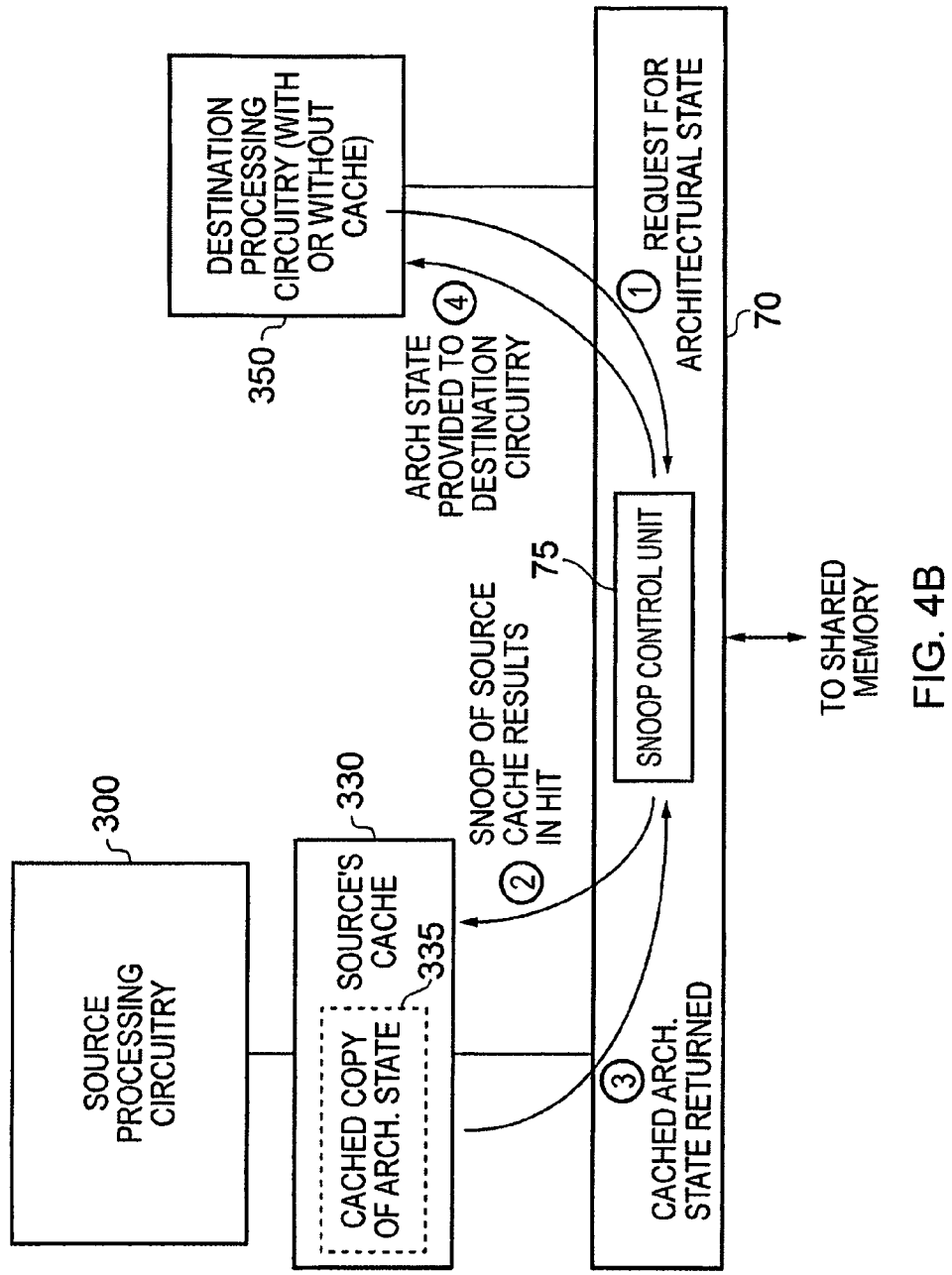
FIG. 4B schematically illustrates the use of the snoop control unit to control the transfer of the source processing circuit's current architectural state to the destination processing circuit during the restore operation of FIG. 3.

The restore operation subsequently performed on the destination processor is then illustrated schematically in FIG. 4B. In particular, the destination processing circuitry 350, which may or may not have its own local cache) will issue a request for a particular item of architectural state, with that request being intercepted by the snoop control unit 75. The snoop control unit will then issue a snoop request to the source processing circuit's local cache 330 to determine whether that item of architectural state is present in the source's cache. Because of the steps taken during the save operation discussed in FIG. 4A, a hit will be detected in the source's cache 330, resulting in that cached architectural state being returned via the snoop control unit 75 to the destination processing circuit 350. This process can be repeated iteratively until all of the items of architectural state have been retrieved via snooping of the source processing circuit's cache. Any processor specific configuration information relevant to destination processing circuit 350 is typically hard-coded in the destination processing circuit 350 as discussed earlier. Thus, once the restore operation has been completed, the destination processing circuitry then has all the information required to enable it to successfully take over handling of the workload.

Further, in one embodiment, regardless of whether the workload 100 is being performed by the "big" processing circuit 10 or "little" processing circuit 50, the virtualiser 120 provides the operating system 115 with virtual configuration information having the same values, and so the hardware differences between the "big" and "little" processing circuits 10, 50 are masked from the operating system 115 by the virtualiser 120. This means that the operating system 115 is unaware that the performance of the workload 100 has been transferred to a different hardware platform.

In accordance with the save and restore operations described with reference to FIGS. 4A and 4B, the various processor instances 10, 50 are arranged to be hardware cache coherent with one another in order to reduce the amount of time, energy and hardware complexity involved in transferring the architectural state from the source processor to the destination processor. The technique uses the source processor's local cache to store all of the state that must be transferred from the source processor to the destination processor and which is not available from shared memory at the time the transfer operation takes place. Because the state is marked as shareable within the source processor's cache, this allows the hardware cache coherent destination processor to snoop this state during the transfer operation. By using such a technique, it is possible to transfer the state between the processor instances without the need to save that state either to main memory or to a local memory mapped storage element. This hence yields significant performance and energy consumption benefits, increasing the variety of situations in which it would be appropriate to switch the workload in order to seek to realise energy consumption benefits.

Figure 5:
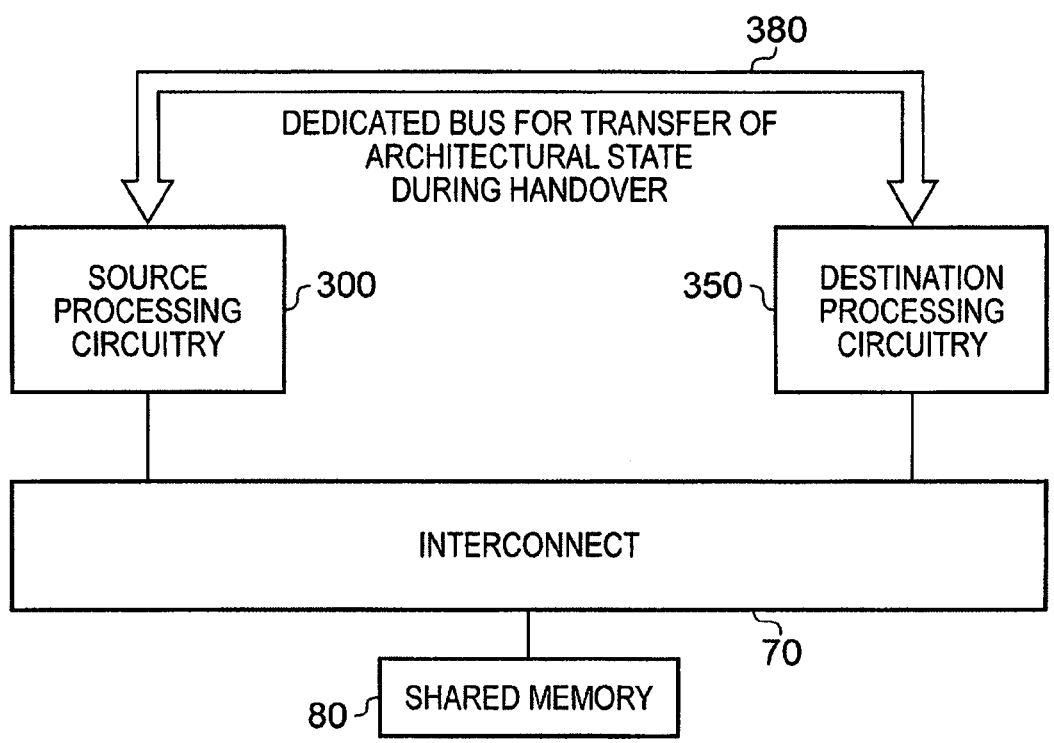
FIG. 5 illustrates an alternative structure for providing an accelerated mechanism for transferring the current architectural state of the source processing circuitry to the destination processing circuitry during the transfer operation in accordance with one embodiment.

However, whilst the technique of using cache coherence as described above provides one accelerated mechanism for making the current architectural state available to the destination processor without routing of the current architectural state via the shared memory, it is not the only way in which such an accelerated mechanism could be implemented. For example, FIG. 5 illustrates an alternative mechanism where a dedicated bus 380 is provided between the source processing circuitry 300 and the destination processing circuitry 350 in order to allow the architectural state to be transferred during the handover operation. Hence, in such embodiments, the save and restore operations 225, 230 of FIG. 3 are replaced with an alternative transfer mechanism utilising the dedicated bus 380. Whilst such an approach will typically have a higher hardware cost than employing the cache coherency approach (the cache coherency approach typically making use of hardware already in place within the data processing system), it would provide an even faster way of performing the switching, which could be beneficial in certain implementations.

FIGS. 6A to 6I schematically illustrate a series of steps that are performed in order to transfer performance of a workload from the source processing circuitry 300 to the destination processing circuitry 350. The source processing circuitry 300 is whichever of the processing circuits 10, 50 is performing the workload before the transfer, with the destination processing circuitry being the other of the processing circuits 10, 50.

Figure 6A:
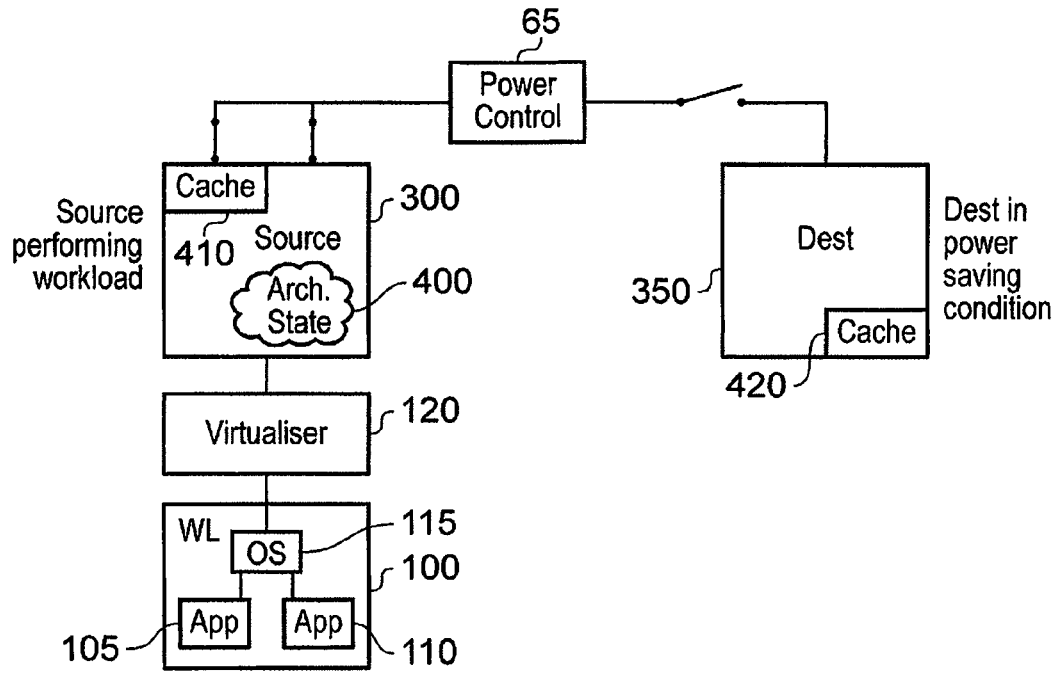
FIGS. 6A to 6I schematically illustrate the steps performed to transfer a workload from a source processing circuit to a destination processing circuit in accordance with one embodiment.

FIG. 6A shows the system in an initial state in which the source processing circuitry 300 is powered by the power controller 65 and is performing the processing workload 100, while the destination processing circuitry 350 is in the power saving condition. In this embodiment, the power saving condition is a power off condition, but as mentioned above other types of power saving condition may also be used. The workload 100, including applications 105, 110 and an operating system 115 for running the applications 105, 110, is abstracted from the hardware platform of the source processing circuitry 300 by the virtualiser 120. While performing the workload 100, the source processing circuitry 300 maintains architectural state 400, which may comprise for example the contents of the register file 310 and special purpose registers 320 as shown in FIG. 4A.

Figure 6B:
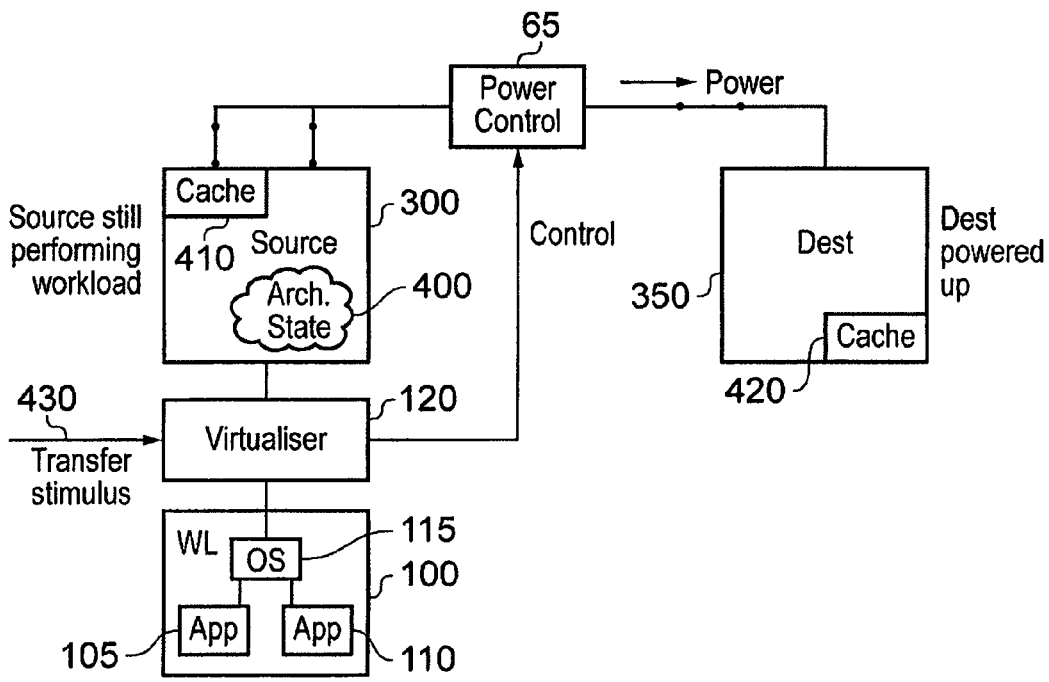

In FIG. 6B, a transfer stimulus 430 is detected by the virtualiser 120. While the transfer stimulus 430 is shown in FIG. 6B as an external event (e.g. detection of thermal runaway by the thermal sensor 90), the transfer stimulus 430 could also be an event triggered by the virtualiser 120 itself or by the operating system 115 (e.g. the operating system 115 could be configured to inform the virtualiser 120 when a particular type of application is to be processed). The virtualiser 120 responds to the transfer stimulus 430 by controlling the power controller 65 to supply power to the destination processing circuitry 350, in order to place the destination processing circuitry 350 in a powered state.

Figure 6C:
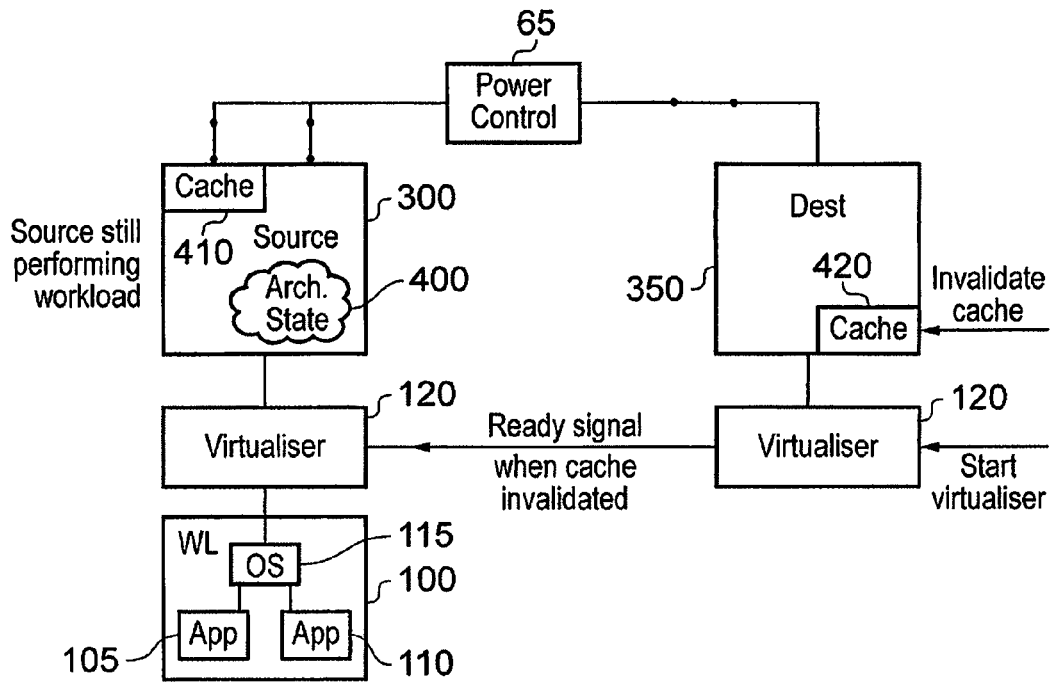

In FIG. 6C, the destination processing circuitry 350 starts executing the virtualiser 120. The virtualiser 120 controls the destination processing circuitry 350 to invalidate its cache 420, in order to prevent processing errors caused by erroneous data values which may be present in the cache 420 on powering up the destination processing circuitry 350. While the destination cache 420 is being invalidated, the source processing circuitry 350 continues to perform the workload 100. When invalidation of the destination cache 420 is complete, the virtualiser 120 controls the destination processing circuitry 350 to signal to the source processing circuitry 300 that it is ready for the handover of the workload 100. By continuing processing of the workload 100 on the source processing circuitry 300 until the destination processing circuitry 350 is ready for the handover operation, the performance impact of the handover can be reduced.

Figure 6D:
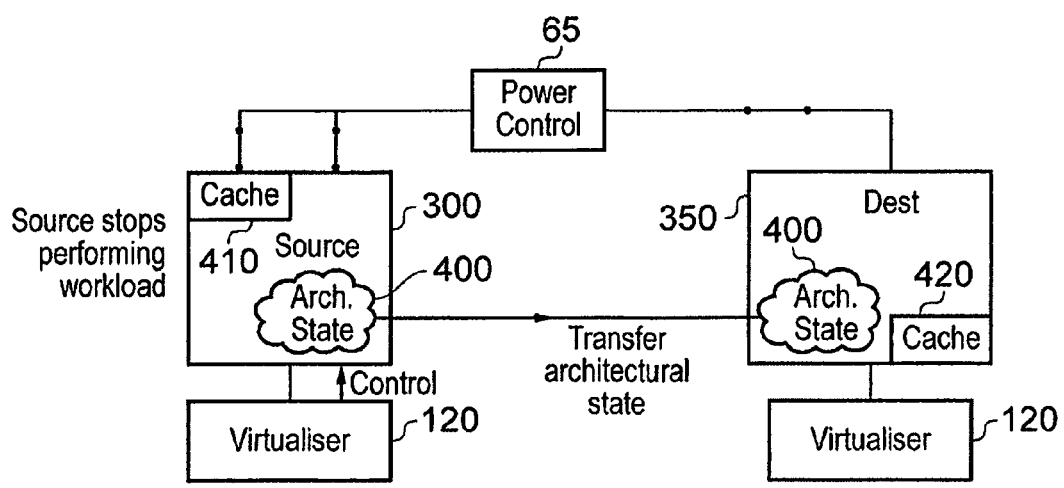
Figure 6E:
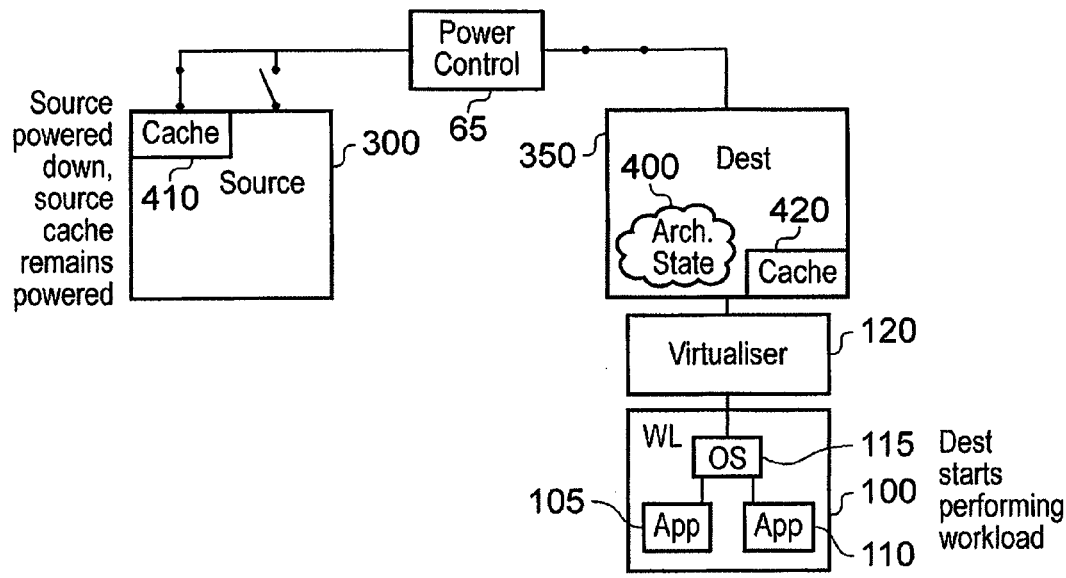

At the next stage, shown in FIG. 6D, the source processing circuitry 300 stops performing the workload 100. During this stage, neither the source processing circuitry 300 nor the destination processing circuitry 350 performs the workload 100. A copy of the architectural state 400 is transferred from the source processing circuitry 300 to the destination processing circuitry 350. For example, the architectural state 400 can be saved to the source cache 410 and restored to the destination processing circuitry 350 as shown in FIGS. 4A and 4B, or can be transferred over a dedicated bus as shown in FIG. 5. The architectural state 400 contains all the state information required for the destination processing circuitry 350 to perform the workload 100, other than the information already present in the shared memory 80.

Having transferred the architectural state 400 to the destination processing circuitry 350, the source processing circuitry 300 is placed in the power saving state by the power control circuitry 65 (see FIG. 6E), with the exception that the source cache 410 remains powered. Meanwhile, the destination processing circuitry 350 begins performing the workload 100 using the transferred architectural state 400.

Figure 6F:
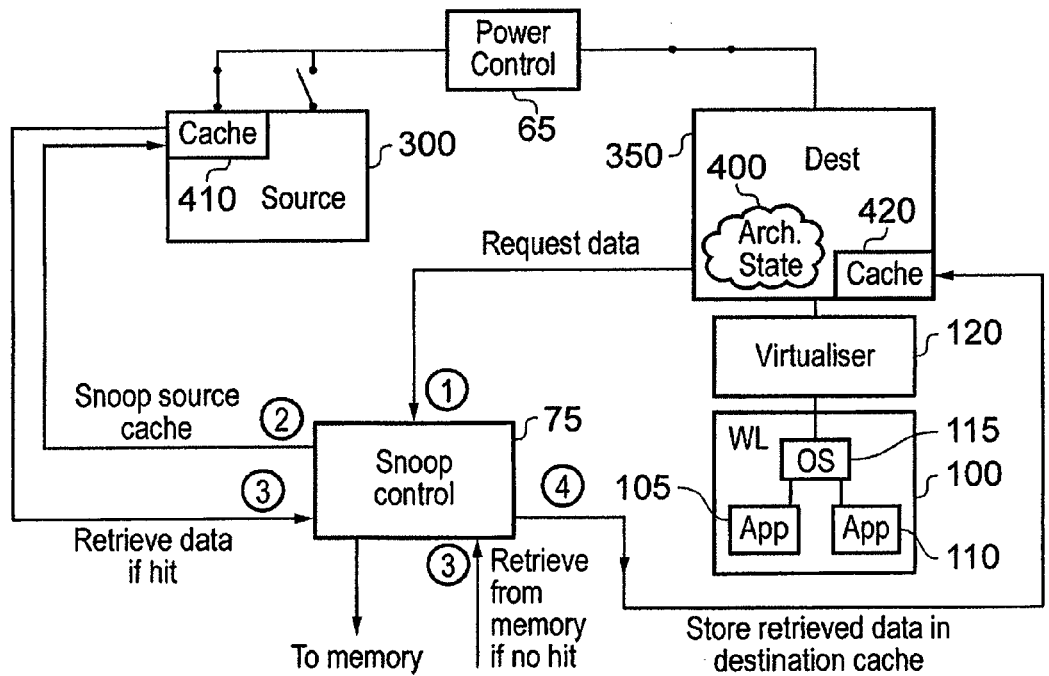

When the destination processing circuitry 350 begins processing the workload 100, the snooping period begins (see FIG. 6F). During the snooping period, the snoop control unit 75 can snoop the data stored in the source cache 410 and retrieve the data on behalf of the destination processing circuitry 350. When the destination processing circuitry 350 requests data that is not present in the destination cache 420, the destination processing circuitry 350 requests data from the snoop control unit 75. The snoop control unit 75 then snoops the source cache 410, and if the snoop results in a cache hit then the snoop control unit 75 retrieves the snooped data from the source cache 410 and returns it to the destination processing circuitry 350 where the snooped data can be stored in the destination cache 420. On the other hand, if the snoop results in a cache miss in the source cache 410 then the requested data is fetched from the shared memory 80 and returned to the destination processing circuitry 350. Since accesses to data in the source cache 410 are faster and require less energy than accesses to shared memory 80, snooping the source cache 410 for a period improves processing performance and reduces energy consumption during an initial period following the handover of the workload 100 to the destination processing circuitry 350.

Figure 6G:
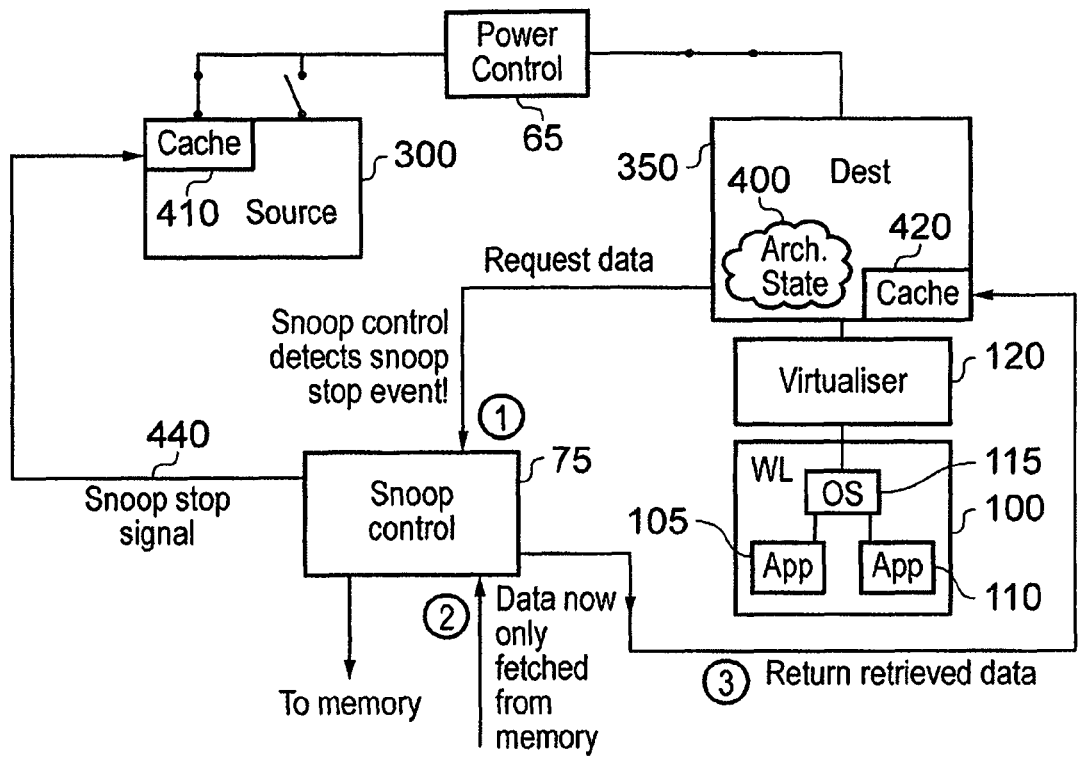

At the step shown in FIG. 6G, the snoop control unit 75 detects a snoop stop event which indicates that it is no longer efficient to maintain the source cache 410 in the powered state. The snoop stop event triggers the end of the snooping period. The snoop stop event may be any one of a set of snoop stop events monitored by the snoop control circuitry 75. For example, the set of snoop stop events can include any one or more of the following events:

a) when the percentage or fraction of snoop hits that result in a cache hit in the source cache 410 (i.e. a quantity proportional to number of snoop hits/number of total snoops) drops below a predetermined threshold level after the destination processing circuitry 350 has started performing the workload 100;

b) when the number of transactions, or the number of transactions of a predetermined type (e.g. cacheable transactions), performed since the destination processing circuitry 350 began performing the workload 100 exceeds a predetermined threshold;

c) when the number of processing cycles elapsed since the destination processing circuitry 350 began performing the workload 100 exceeds a predetermined threshold;

d) when a particular region of the shared memory 80 is accessed for the first time since the destination processing circuitry 350 began performing the workload 100;

e) when a particular region of the shared memory 80, which was accessed for an initial period after the destination processing circuitry 350 began performing the workload 100, is not accessed for a predetermined number of cycles or a predetermined period of time;

f) when the destination processing circuitry 350 writes to a predetermined memory location for the first time since starting to perform the transferred workload 100.

These snoop stop events can be detected using programmable counters in the coherent interconnect 70 that includes the snoop control unit 75. Other types of snoop stop event may also be included in the set of snoop stop events.

On detecting a snoop stop event, the snoop control unit 75 sends a snoop stop signal 440 to the source processor 300. The snoop control unit 75 stops snooping the source cache 410 and from now on responds to data access requests from the destination processing circuitry 350 by fetching the requested data from shared memory 80 and returning the fetched data to the destination processing circuitry 350, where the fetched data can be cached.

Figure 6H:
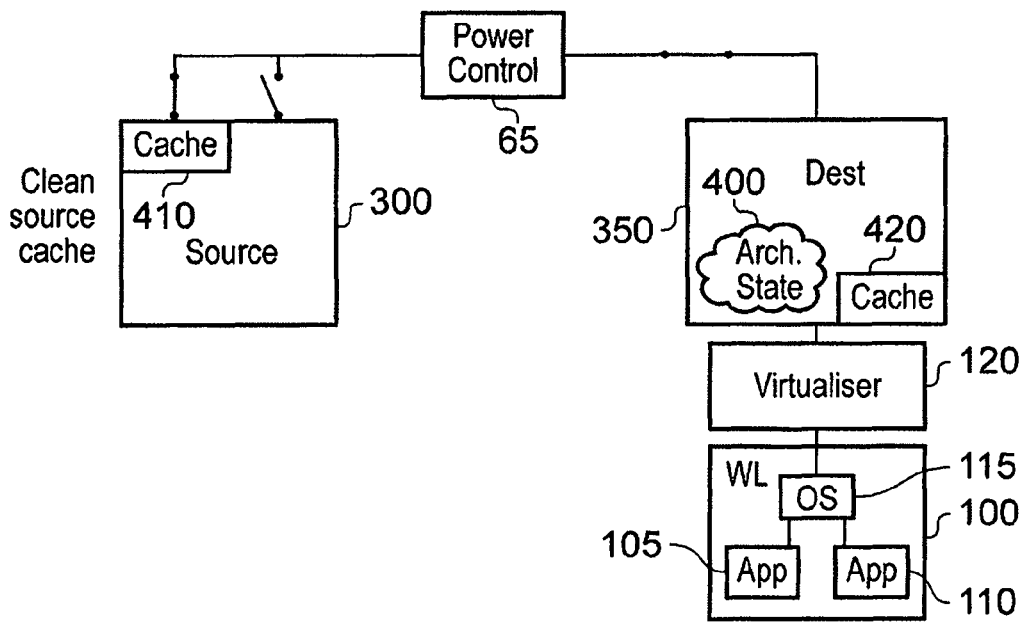

In FIG. 6H, the source cache's control circuit is responsive to the snoop stop signal 440 to clean the cache 410 in order to save to the shared memory 80 any valid and dirty data values (i.e. whose cached value is more up-to-date than the corresponding value in shared memory 80).

Figure 6I:
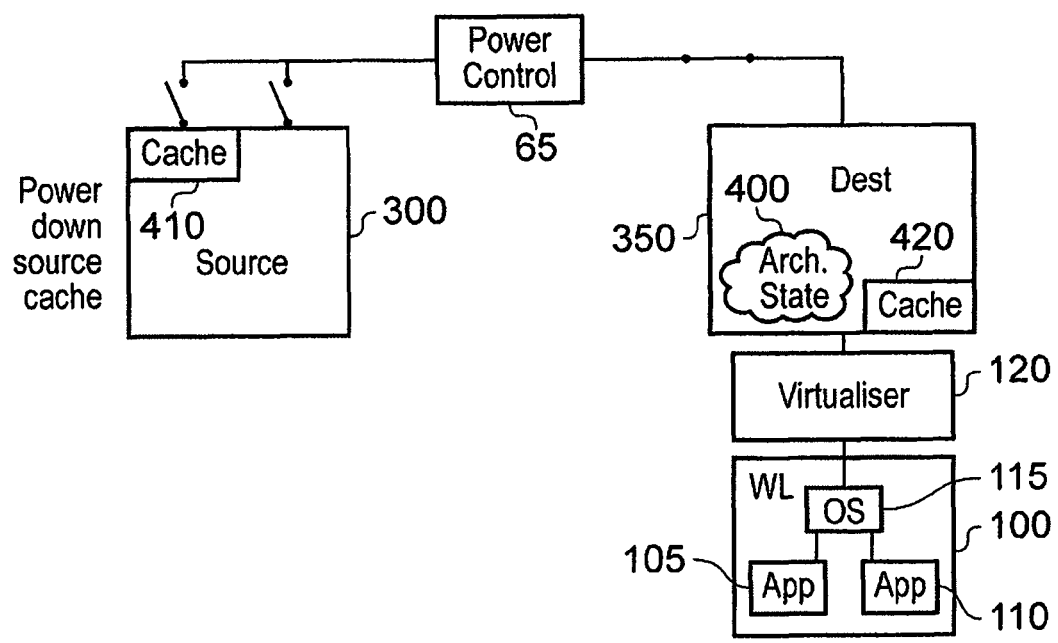

In FIG. 6I, the source cache 410 is then powered down by the power controller 65 so that the source processing circuitry 300 is entirely in the power saving state. The destination processing circuitry 350 continues to perform the workload 100. From the point of view of the operating system 115, the situation is now the same as in FIG. 6A. The operating system 115 is not aware that execution of the workload has transferred from one processing circuit to another processing circuit. When another transfer stimulus occurs, then the same steps of FIGS. 6A to 6I can be used to switch performance of the workload back to the first processor (in this case which of the processing circuits 10, 50 are the "source processing circuitry" and "destination processing circuitry" will be reversed).

In the embodiment of FIGS. 6A to 6I, independent power control to the cache 410 and the source processing circuitry 300 is available so that the source processing circuitry 300, other than the source cache 410, can be powered down once the destination processing circuitry 350 has started performing the workload (see FIG. 6E), while only the cache 410 of the source processing circuitry 350 remains in the powered state (see FIGS. 6F to 6H). The source cache 410 is then powered down in FIG. 6I. This approach can be useful to save energy, especially when the source processing circuitry 300 is the "big" processing circuit 10.

However, it is also possible to continue to power the entire source processing circuitry 300 during the snooping period, and to then place the source processing circuitry 300 as a whole in the power saving state at FIG. 6I, following the end of the snooping period and the cleaning of the source cache 410. This may be more useful in the case where the source cache 410 is too deeply embedded with the source processor core to be able to be powered independently from the source processor core. This approach can also be more practical when the source processor is the "little" processing circuit 50, whose power consumption is insignificant in comparison to the "big" processing circuit 10, since once the "big" processing circuit 10 has started processing the transferred workload 100 then switching the "little" processing circuit 50, other than the cache 60, to the power saving state during the snooping period may have little effect on the overall power consumption of the system. This may mean that the extra hardware complexity of providing individual power control to the "little" processing circuit 50 and the "little" core's cache 60 may not be justified.

In some situations, it may be known before the workload transfer that the data stored in the source cache 410 will not be needed by the destination processing circuitry 350 when it begins to perform the workload 100. For example, the source processing circuitry 300 may just have completed an application when the transfer occurs, and therefore the data in the source cache 410 at the time of the transfer relates to the completed application and not the application to be performed by the destination processing circuitry 350 after the transfer. In such a case, a snoop override controller can trigger the virtualiser 120 and snoop control circuitry 75 to override the snooping of the source cache 410 and to control the source processing circuit 300 to clean and power down the source cache 410 without waiting for a snoop stop event to signal the end of the snooping period. In this case, the technique of FIGS. 6A to 6I would jump from the step of FIG. 6E straight to the step of FIG. 6G, without the step of FIG. 6F in which data is snooped from the source cache 410. Thus, if it is known in advance that the data in the source cache 410 will not be useful for the destination processing circuitry 350, power can be saved by placing the source cache 410 and source processing circuitry 300 in the power saving condition without waiting for a snoop stop event. The snoop override controller can be part of the virtualiser 120, or can be implemented as firmware executing on the source processing circuitry 300. The snoop override controller could also be implemented as a combination of elements, for example the operating system 115 could inform the virtualiser 120 when an application has finished, and the virtualiser 120 could then override snooping of the source cache 410 if a transfer occurs when an application has finished.

Figure 7:
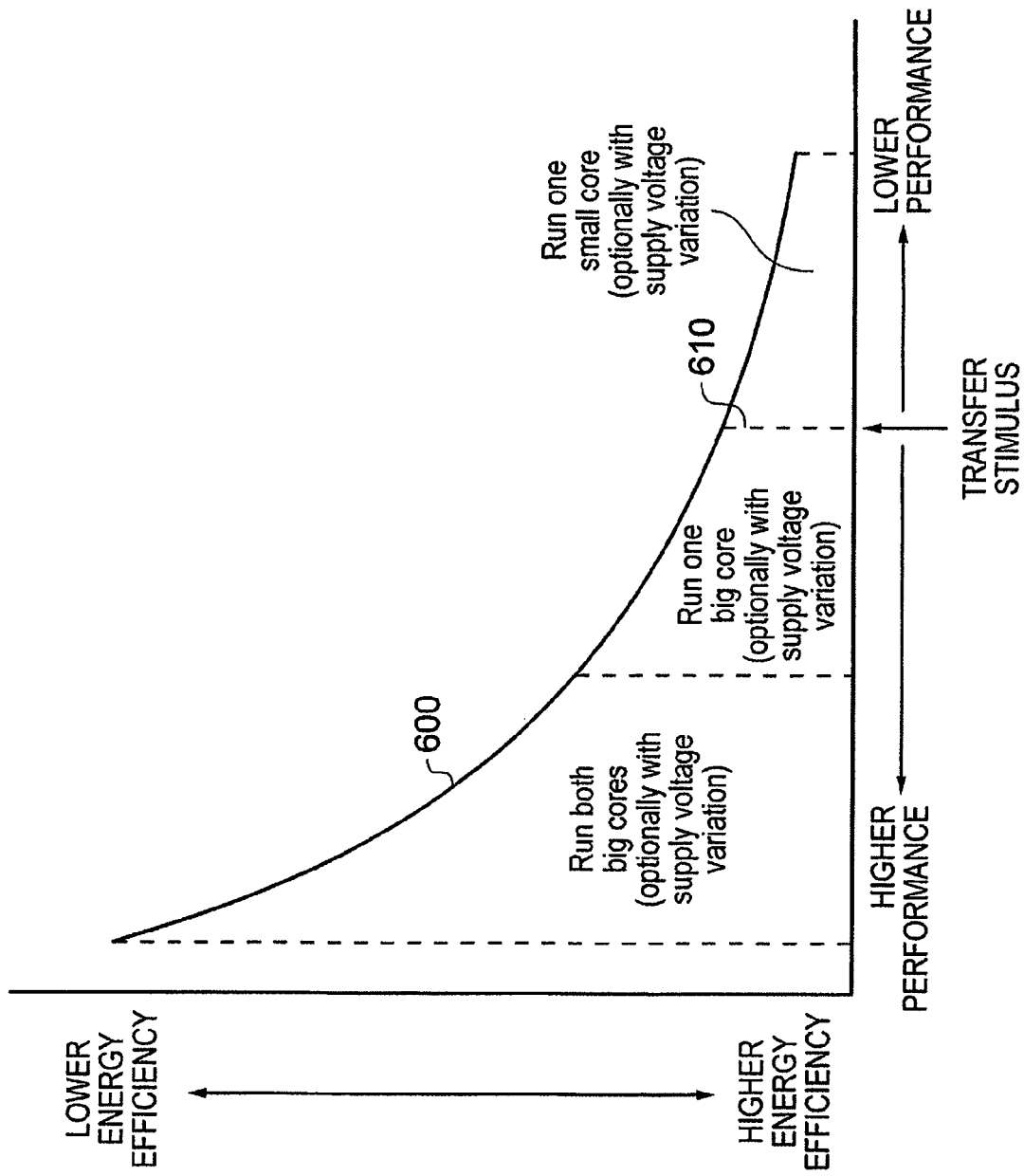
FIG. 7 is a graph showing energy efficiency variation with performance, and illustrating how the various processor cores illustrated in FIG. 1 are used at various points along that curve in accordance with one embodiment.

FIG. 7 is a graph on which the line 600 illustrates how energy consumption varies with performance. For various portions of this graph, the data processing system can be arranged to utilise different combinations of the processor cores 15, 20, 55 illustrated in FIG. 1 in order to seek to obtain the appropriate trade-off between performance and energy consumption. Hence, by way of example, when a number of very high performance tasks need to be executed, it is possible to run both of the big cores 15, 20 of the processing circuit 10 in order to achieve the desired performance. Optionally supply voltage variation techniques can be used to allow some variation in performance and energy consumption when utilising these two cores.

When the performance requirements drop to a level where the required performance can be achieved using only one of the big cores, then the tasks can be migrated on to just one of the big cores 15, 20, with the other core being powered down or put into some other power saving condition. Again supply voltage variation can be used to allow some variation between performance and energy consumption when using such a single big core. It should be noted that the transition from two big cores to one big core will not require a generation of a transfer stimulus, nor the use of the above described techniques for transferring workload, since in all instances it is the processing circuit 10 that is being utilised, and the processing circuit 50 will be in a power saving condition. However, as indicated by the dotted line 610 in FIG. 7, when the performance drops to a level where the small core is able to achieve the required performance, then a transfer stimulus can be generated to trigger the earlier described mechanism for transferring the entire workload from the processing circuit 10 to the processing circuit 50, such that the entire workload is then run on the small core 55, with the processing circuit 10 being placed into a power saving condition. Again, supply voltage variation can be used to allow some variation in the performance and energy consumption of the small core 55.

Figure 8A:
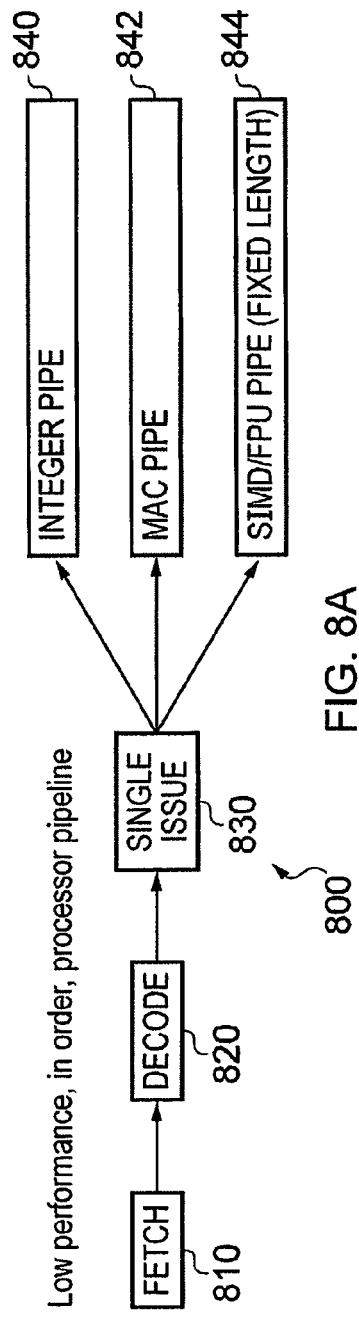
FIGS. 8A and 8B schematically illustrate a low performance processor pipeline and a high performance processor pipeline, respectively, as utilised in one embodiment.
Figure 8B:
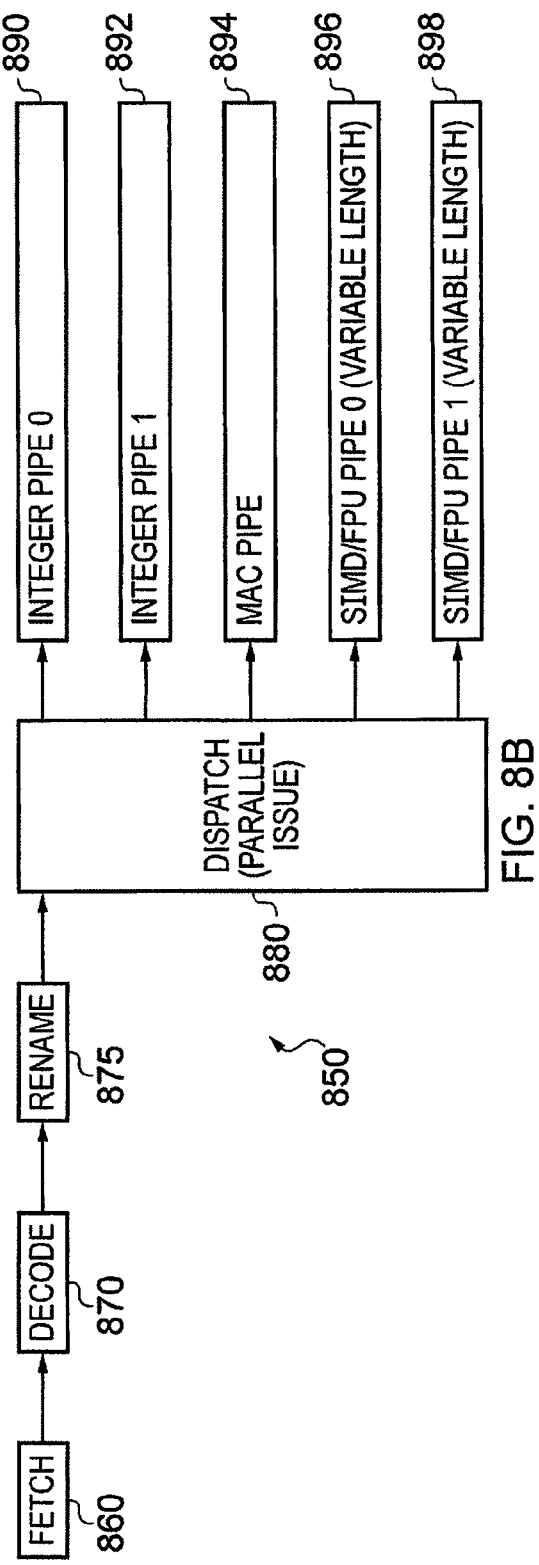

FIGS. 8A and 8B respectively illustrate micro-architectural differences between a low performance processor pipeline 800 and a high performance processor pipeline 850 according to one embodiment. The low performance processor pipeline 800 of FIG. 8A would be suitable for the little processing core 55 of FIG. 1, whereas the high performance processor pipeline 850 of FIG. 8B would be suitable for the big cores 15, 20.

The low performance processor pipeline 800 of FIG. 8A comprises a fetch stage 810 for fetching instructions from memory 80, a decode stage 820 for decoding the fetched instructions, an issue stage 830 for issuing instructions for execution, and multiple execution pipelines including an integer pipeline 840 for performing integer operations, a MAC pipeline 842 for performing multiply accumulate operations, and a SIMD/FPU pipeline 844 for performing SIMD (single instruction, multiple data) operations or floating point operations. In the low performance processor pipeline 800, the issue stage 830 issues a single instruction at a time, and issues the instructions in the order in which the instructions are fetched.

The high performance processor pipeline 850 of FIG. 8B comprises a fetch stage 860 for fetching instructions from memory 80, a decode stage 870 for decoding the fetched instructions, a rename stage 875 for renaming registers specified in the decoded instructions, a dispatch stage 880 for dispatching instructions for execution, and multiple execution pipelines including two integer pipelines 890, 892, a MAC pipeline 894, and two SIMD/FPU pipelines 896, 898. In the high performance processor pipeline 850, the dispatch stage 880 is a parallel issue stage which can issue multiple instructions to different ones of the pipelines 890, 892, 894, 896, 898 at once. The dispatch stage 880 can also issue the instructions out-of-order. Unlike in the low performance processor pipeline 800, the SIMD/FPU pipelines 896, 898 are variable length, which means that operations proceeding through the SIMD/FPU pipelines 896, 898 can be controlled to skip certain stages. An advantage of such an approach is that if multiple execution pipelines each have different resources, there is no need to artificially lengthen the shortest pipeline to make it the same length as the longest pipeline, but instead logic is required to deal with the out-of-order nature of the results produced by the different pipelines (for example to place everything back in order if a processing exception occurs).

The rename stage 875 is provided to map register specifiers, which are included in program instructions and identify particular architectural registers when viewed from a programmer's model point of view, to physical registers which are the actual registers of the hardware platform. The rename stage 875 enables a larger pool of physical registers to be provided by the microprocessor than are present within the programmer's model view of the microprocessor. This larger pool of physical registers is useful during out-of-order execution because it enables hazards such as write-after-write (WAW) hazards to be avoided by mapping the same architectural register specified in two or more different instructions to two or more different physical registers, so that the different instructions can be executed concurrently. For more details of register renaming techniques, the reader is referred to commonly owned US patent application US 2008/114966 and U.S. Pat. No. 7,590,826.

The low-performance pipeline 800 and high-performance pipeline 850 are micro-architecturally different in a number of ways. The micro-architectural differences can include:
- a) the pipelines having different stages. For example, the high-performance pipeline 850 has a rename stage 875 which is not present in the low-performance pipeline 800.
- b) the pipeline stages having different capabilities. For example, the issue stage 830 of the low-performance pipeline 800 is capable only of single issue of instructions, whereas the dispatch stage 880 of the high performance pipeline 850 can issue instructions in parallel. Parallel issue improves the processing throughput of the pipeline and so improves performance.
- c) the pipeline stages having different lengths. For example, the decode stage 870 of the high-performance pipeline 850 may include three sub-stages whereas the decode stage 820 of the low-performance pipeline 800 may include only a single sub-stage. The longer a pipeline stage (the greater the number of sub-stages), the greater the number of instructions which can be in flight at the same time, and so greater the operating frequency at which the pipeline can operate, which results in a higher level of performance.
- d) a different number of execution pipelines (e.g. the high-performance pipeline 850 has more execution pipelines than the low-performance pipeline 800). By providing more execution pipelines, more instructions can be processed in parallel and so performance is increased.
- e) providing in-order execution (as in pipeline 800) or out-of-order execution (as in pipeline 850). When instructions can be executed out-of-order, then performance is improved since the execution of instructions can be dynamically scheduled to optimize performance. For example, in the low-performance in-order pipeline 800 a series of MAC instructions would need to be executed one by one by the MAC pipeline 842 before a later instruction could be executed by one of the integer pipeline 840 and SIMD/floating point pipeline 844. In contrast, in the high-performance pipeline 850 then the MAC instructions could be executed by the MAC pipe 894, while (subject to any data hazards which cannot be resolved by renaming) a later instruction using a different execution pipeline 890, 892, 896, 898 can be executed in parallel with the MAC instructions. This means that out-of-order execution can improve processing performance.

These, and other examples of, micro-architectural differences result in the pipeline 850 providing higher performance processing than the pipeline 800. On the other hand, the micro-architectural differences also make the pipeline 850 consume more energy than the pipeline 800. Thus, providing micro-architecturally different pipelines 800, 850 enables the processing of the workload to be optimised for either high performance (by using a "big" processing circuit 10 having the high-performance pipeline 850) or energy efficiency (by using a "little" processing circuit 50 having the low-performance pipeline 800).

Figure 9:
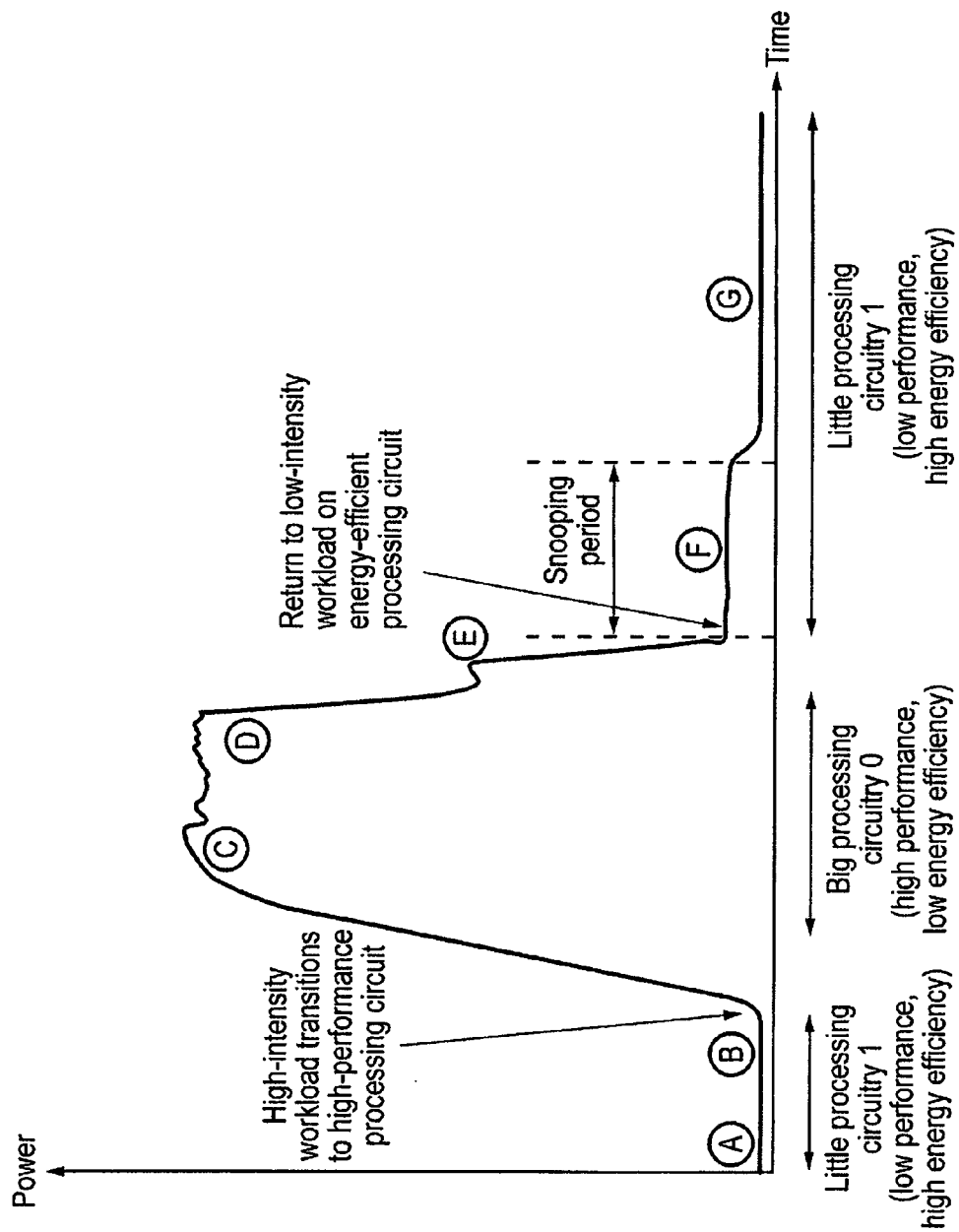
FIG. 9 is a graph showing the variation in power consumed by the data processing system as performance of a processing workload is switched between a low performance, high energy efficiency, processing circuit and a high performance, low energy efficiency, processing circuit.

FIG. 9 shows a graph illustrating the variation in power consumption of the data processing system as performance of the workload 100 is switched between the big processing circuit 10 and the little processing circuit 50.

At point A of FIG. 9, the workload 100 is being performed on the little processing circuitry 50 and so power consumption is low. At point B, a transfer stimulus occurs indicating that high-intensity processing is to be performed and so the performance of the workload is handed over to the big processing circuitry 10. The power consumption then rises and remains high at point C while the big processing circuitry 10 is performing the workload. At point D it is assumed that both big cores are operating in combination to process the workload. If however the performance requirements drop to a level where the workload can be handled by only one of the big cores, then the workload is migrated to only one of the big cores, and the other is powered down, as indicated by the drop in power to the level adjacent point E. However, at point E, another transfer stimulus occurs (indicating that a return to low-intensity processing is desired) to trigger a transfer of the performance of the workload back to the little processing circuitry 50.

When the little processing circuitry 50 starts processing the processing workload, most of the big processing circuitry is in the power saving state, but the cache of the big processing circuitry 10 remains powered during the snooping period (point F in FIG. 9) to enable the data in the cache to be retrieved for the little processing circuitry 50. Hence, the cache of the big processing circuitry 10 causes the power consumption at point F to be higher than at point A when only the little processing circuitry 50 was powered. At the end of the snooping period, the cache of the big processing circuitry 10 is powered down and at point G power consumption returns to the low level when only the little processing circuitry 50 is active.

As mentioned above, in FIG. 9 the power consumption is higher during the snooping period at point F than at point G due to the cache of the big processing circuitry 10 being powered during the snooping period. Although this increase in power consumption is indicated only following the big-to-little transition, following the little-to-big transition there may also be a snooping period, during which the data in the cache of the little processing circuitry 50 can be snooped on behalf of the big processing circuitry 10 by the snoop control unit 75. The snooping period for the little-to-big transition has not been indicated in FIG. 9 because the power consumed by leaving the cache of the little processing circuitry 50 in a powered state during the snooping period is insignificant in comparison with the power consumed by the big processing circuitry 10 when performing the processing workload, and so the very small increase in power consumption due to the cache of the little processing circuitry 50 being powered is not visible in the graph of FIG. 9.

The above described embodiments describe a system containing two or more architecturally compatible processor instances with micro-architectures optimised for energy efficiency or performance. The architectural state required by the operating system and applications can be switched between the processor instances depending on the required performance/energy level, in order to allow the entire workload to be switched between the processor instances. In one embodiment, only one of the processor instances is running the workload at any given time, with the other processing instance being in a power saving condition, or in the process of entering/exiting the power saving condition.

In one embodiment, the processor instances may be arranged to be hardware cache coherent with one another to reduce the amount of time, energy and hardware complexity involved in switching the architectural state from the source processor to the destination processor. This reduces the time to perform the switching operation, which increases the opportunities in which the techniques of embodiments can be used.

Such systems may be used in a variety of situations where energy efficiency is important for either battery life and/or thermal management, and the spread of performance is such that a more energy efficient processor can be used for lower processing workloads while a higher performance processor can be used for higher processing workloads.

Because the two or more processing instances are architecturally compatible, from an application perspective the only difference between the two processors is the performance available. Through techniques of one embodiment, all architectural state required can be moved between the processors without needing to involve the operating system, such that it is then transparent to the operating system and the applications running on the operating system as to which processor that operating system and applications are running on.

When using architecturally compatible processor instances as described in the above embodiments, the total amount of architectural state that needs to be transferred can easily fit within a data cache, and since modern processing systems often implement cache coherence, then by storing the architectural state to be switched inside the data cache, the destination processor can rapidly snoop this state in an energy efficient way making use of existing circuit structures.

In one described embodiment, the switching mechanism is used to ensure thermal limits for the data processing system are not breached. In particular, when the thermal limits are about to be reached, the entire workload can be switched to a more energy efficient processor instance, allowing the overall system to cool while continued program execution takes place, albeit at a lower throughput.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
   first processing circuitry for performing data processing operations;
   second processing circuitry for performing data processing operations;
   the first processing circuitry being architecturally compatible with the second processing circuitry, such that a workload to be performed by the data processing apparatus can be performed on either the first processing circuitry or the second processing circuitry, said workload comprising at least one application and at least one operating system for running said at least one application;
   the first processing circuitry being micro-architecturally different from the second processing circuitry, such that performance of the first processing circuitry is different to performance of the second processing circuitry;
   the first and second processing circuitry being configured such that the workload is performed by one of the first processing circuitry and the second processing circuitry at any point in time;
   a switch controller, responsive to a transfer stimulus, to perform a handover operation to transfer performance of the workload from source processing circuitry to destination processing circuitry, the source processing circuitry being one of the first processing circuitry and the second processing circuitry, and the destination processing circuitry being the other of the first processing circuitry and the second processing circuitry;
   the switch controller comprising at least virtualisation software logically separating the at least one operating system from the first processing circuitry and the second processing circuitry, and the switch controller configured, during the handover operation:
   (i) to cause the source processing circuitry to make its current architectural state available to the destination processing circuitry, the current architectural state being that state not available from shared memory shared between the first and second processing circuitry at a time the handover operation is initiated, and that is necessary for the destination processing circuitry to successfully take over performance of the workload from the source processing circuitry; and
   (ii) to employ the virtualisation software to mask predetermined processor specific configuration information from said at least one operating system such that the transfer of the workload is transparent to said at least one operating system.

2. A data processing apparatus as claimed in claim 1, further comprising:
power control circuitry for independently controlling power provided to the first processing circuitry and the second processing circuitry;
wherein prior to occurrence of the transfer stimulus the destination processing circuitry is in a power saving condition, and during the handover operation the power control circuitry causes the destination processing circuitry to exit the power saving condition prior to the destination processing circuitry taking over performance of the workload.

3. A data processing apparatus as claimed in claim 2, wherein following the handover operation the power control circuitry causes the source processing circuitry to enter the power saving condition.

4. A data processing apparatus as claimed in claim 1, wherein during the transfer operation the switch controller causes the source processing circuitry to employ an accelerated mechanism to make its current architectural state available to the destination processing circuitry without reference by the destination processing circuitry to the shared memory in order to obtain the current architectural state.

5. A data processing apparatus as claimed in claim 4, wherein:
at least the source circuitry has an associated cache;
the data processing apparatus further comprises snoop control circuitry; and
the accelerated mechanism comprises transfer of the current architectural state to the destination processing circuitry through use of the source circuitry's associated cache and the snoop control circuitry.

6. A data processing apparatus as claimed in claim 5, wherein the accelerated mechanism is a save and restore mechanism, which causes the source processing circuitry to store its current architectural state to its associated cache, and causes the destination processing circuitry to perform a restore operation via which the snoop control circuitry retrieves the current architectural state from the source processing circuitry's associated cache and provides that retrieved current architectural state to the destination processing circuitry.

7. A data processing apparatus as claimed in claim 5, wherein the destination processing circuitry has an associated cache in which the transferred architectural state obtained by the snoop control circuitry is stored for reference by the destination processing circuitry.

8. A data processing apparatus as claimed in claim 4, wherein the accelerated mechanism comprises a dedicated bus between the source processing circuitry and the destination processing circuitry over which the source processing circuitry provides its current architectural state to the destination processing circuitry.

9. A data processing apparatus as claimed in claim 1, wherein the first processing circuitry and the second processing circuitry reside within a single integrated circuit.

10. A data processing apparatus as claimed in claim 1, wherein timing of the transfer stimulus is chosen so as to improve energy efficiency of the data processing apparatus.

11. A data processing apparatus as claimed in claim 1, wherein said architectural state comprises at least the current value of one or more special purpose registers of the source processing circuitry, including a program counter value.

12. A data processing apparatus as claimed in claim 11, wherein said architectural state further comprises the current values stored in an architectural register file of the source processing circuitry.

13. A data processing apparatus as claimed in claim 1, wherein at least one of the first processing circuitry and the second processing circuitry comprise a single processing unit.

14. A data processing apparatus as claimed in claim 1, wherein at least one of the first processing circuitry and the second processing circuitry comprise a cluster of processing units with the same microarchitecture.

15. A data processing apparatus as claimed in claim 2, wherein said power saving condition is one of:
a powered off condition;
a partial/full data retention condition;
a dormant condition; or
an idle condition.

16. A data processing apparatus as claimed in claim 1 wherein the first processing circuitry and second processing circuitry are micro-architecturally different by having at least one of:
different execution pipeline lengths; or
different execution resources.

17. A data processing apparatus as claimed in claim 1, wherein the source processing circuitry is higher performance than the destination processing circuitry, and the data processing apparatus further comprises:
thermal monitoring circuitry for monitoring a thermal output of the source processing circuitry, and for triggering said transfer stimulus when said thermal output reaches a predetermined level.

18. A method of operating a data processing apparatus having first processing circuitry for performing data processing operations and second processing circuitry for performing data processing operations, the first processing circuitry being architecturally compatible with the second processing circuitry, such that a workload to be performed by the data processing apparatus can be performed on either the first processing circuitry or the second processing circuitry, said workload comprising at least one application and at least one operating system for running said at least one application, and the first processing circuitry being micro-architecturally different from the second processing circuitry, such that performance of the first processing circuitry is different to performance of the second processing circuitry, the method comprising the steps of:
performing, at any point in time, the workload on one of the first processing circuitry and the second processing circuitry;
performing, in response to a transfer stimulus, a handover operation to transfer performance of the workload from source processing circuitry to destination processing circuitry, the source processing circuitry being one of the first processing circuitry and the second processing circuitry, and the destination processing circuitry being the other of the first processing circuitry and the second processing circuitry;
the handover operation is performed using virtualisation software that logically separates the at least one operating system from the first processing circuitry and the second processing circuitry, and during the handover operation:
(i) causing the source processing circuitry to make its current architectural state available to the destination processing circuitry, the current architectural state being that state not available from shared memory shared between the first and second processing circuitry at a time the handover operation is initiated, and that is necessary for the destination processing circuitry to successfully take over performance of the workload from the source processing circuitry; and (ii) masking predetermined processor specific configuration information from said at least one operating system using the visualisation software, such that the transfer of the workload is transparent to said at least one operating system.

19. A data processing apparatus comprising:

first processing means for performing data processing operations;

second processing means for performing data processing operations;

the first processing means being architecturally compatible with the second processing means, such that a workload to be performed by the data processing apparatus can be performed on either the first processing means or the second processing means, said workload comprising at least one application and at least one operating system for running said at least one application;

the first processing means being micro-architecturally different from the second processing means, such that performance of the first processing means is different to performance of the second processing means;

the first and second processing means being configured such that the workload is performed by one of the first processing means and the second processing means at any point in time;

a transfer control means, responsive to a transfer stimulus, for performing a handover operation to transfer performance of the workload from source processing means to destination processing means, the source processing means being one of the first processing means and the second processing means, and the destination processing means being the other of the first processing means and the second processing means;

the transfer control means comprising at least virtualisation software logically separating the at least one operating system from the first processing means and the second processing means, and the transfer control means, during the handover operation:

(i) for causing the source processing means to make its current architectural state available to the destination processing means, the current architectural state being that state not available from shared memory means shared between the first and second processing means at a time the handover operation is initiated, and that is necessary for the destination processing means to successfully take over performance of the workload from the source processing means; and (ii) for employing the virtualisation software to mask predetermined processor specific configuration information from said at least one operating system such that the transfer of the workload is transparent to said at least one operating system.

\* \* \* \* \*